US012666260B2

(12) United States Patent
Yang et al.

(10) Patent No.: US 12,666,260 B2
(45) Date of Patent: Jun. 23, 2026

(54) SECURITY AUTHENTICATION METHOD AND APPARATUS APPLIED TO WI-FI

(71) Applicant: HUAWEI TECHNOLOGIES CO., LTD., Shenzhen (CN)

(72) Inventors: Yanjiang Yang, Singapore (SG); Kai Liu, Shanghai (CN); Yanjie Gu, Shenzhen (CN); Lianbing Tian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 18/323,211

(22) Filed: May 24, 2023

(65) Prior Publication Data

US 2023/0308874 A1      Sep. 28, 2023

Related U.S. Application Data

(63) Continuation of application No. PCT/CN2020/131854, filed on Nov. 26, 2020.

(51) Int. Cl.
*H04W 12/06*          (2021.01)
*H04L 9/08*          (2006.01)
(Continued)

(52) U.S. Cl.
CPC ......... *H04W 12/06* (2013.01); *H04W 12/041* (2021.01); *H04W 12/0431* (2021.01)

(58) Field of Classification Search
None
See application file for complete search history.

(56) References Cited

U.S. PATENT DOCUMENTS 8,126,145 B1 *   2/2012   Tewari ................... H04W 12/50
                                                                    370/428
8,281,133 B1 *   10/2012   Tkal ...................... H04W 12/50
                                                                    713/171
(Continued)

FOREIGN PATENT DOCUMENTS

CN          103096307 A        5/2013
CN          105100048 B        6/2018
(Continued)

OTHER PUBLICATIONS

Karim Lounis et al., "WPA3 Connection Deprivation Attacks," Queen's Reliable Software Technology Lab, School of Computing, Queens' University, Kingston, ON, Canada, Springer Nature Switzerland AG 2020, CRISIS 2019, LNCS 12026; Feb. 24-28, 2020, Cornell University Library, Ithaca, NY, XP047549887; pp. 164-176 (13 total pages).

(Continued)

*Primary Examiner* — San Htun
(74) *Attorney, Agent, or Firm* — Rimon PC

(57)          ABSTRACT
This application provides a security authentication method and apparatus applied to Wi-Fi. An access point AP negotiates, based on a password, a pairwise master key PMK with a first device based on a twin base password encrypted key exchange TBPEKE protocol, where the password is a shared key between the AP and the first device; and the AP performs a 4-way handshake with the first device based on the PMK. Therefore, in embodiments of this application, a PMK with a high entropy value can be generated by performing a TBPEKE procedure, so that the security authentication method provided in embodiments of this application can help resist an offline dictionary attack.

17 Claims, 7 Drawing Sheets

400

(51) Int. Cl.
H04W 12/041 (2021.01)
H04W 12/0431 (2021.01)

(56) References Cited

U.S. PATENT DOCUMENTS

| | | | | |
|---|---|---|---|---|
| 2014/0259136 A1* | 9/2014 | Levy | H04L 67/104 | |
| | | | | 726/7 |
| 2015/0334571 A1* | 11/2015 | Xu | H04W 12/06 | |
| | | | | 455/410 |
| 2019/0261168 A1* | 8/2019 | Shi | H04W 12/35 | |
| 2020/0396075 A1* | 12/2020 | Visegrady | H04L 9/3234 | |
| 2021/0084493 A1* | 3/2021 | Naribole | H04W 12/041 | |

FOREIGN PATENT DOCUMENTS

| | | |
|---|---|---|
| CN | 110087240 A | 8/2019 |
| KR | 20190049449 A | 5/2019 |
| WO | 2017050108 A1 | 3/2017 |
| WO | 2018084802 A1 | 5/2018 |

OTHER PUBLICATIONS

Po-Kai Huang et al., "Proposed Draft Specification for ML General, MLD Authentication, MLD Association, and ML Setup," doc.:

IEEE 802.11-20/1309r4, Intel Corporation, vol. 802.11, No. 4, Aug. 2020, XP068173190; 34 total pages (pp. 1-34).
David Pointcheval et al., "VTBPEKE: Verifier-based Two-Basis Password Exponential Key Exchange," Proceedings of the 2017 ACM Symposium on Information, computer and communications security (AsiaCCS '17) Abu Dhabi, United Arab Emirites, ACM Press; | 2017 (Apr. 2, 2017), Apr. 4-6, 2017, XP55905329; 18 total pages.
Anonymous: "IEEE 802.11i-2004," Wikipedia, (Oct. 21, 2020), XP055742445; 5 total pages.
Po-Kai Huang (Intel): "Proposed Draft Specification for ML General, MLD Authentication, MLD Association, and ML Setup," IEEE P802.11 Wireless LANS, Aug. 2020; IEEE-SA Mentor, Piscataway. NJ USA, vol. 802.11 EHT; 802.11 be, vol. 4, Sep. 14, 2020 (Sep. 14, 2020); 34 total pages.
Lounis et al., "WPA3 Connection Deprivation Attacks," Feb. 28, 2020 (Feb. 28, 2020), Topics in Cryptology—CT—RSA 2020 : The Cryptographers Track At the RSA Conference 2020, San Francisco, CA, USA, Feb. 24-28, 2020, Cornell University Library, 201 Olin Library Cornell University Ithaca, NY 14853; pp. 164-176 (13 total pages).
Pointcheval et al., "VTBPEKE: Verifier-based Two-Basis Password Exponential Key Exchange," Proceedings of the 2017 ACM Symposium on Information, computer and communications security (AsiaCCS '17), Apr. 4-6, 2017, Abu Dhabi, United Arab Emirates), ACM Press; pp. 301-312 (18 total pages).

* cited by examiner

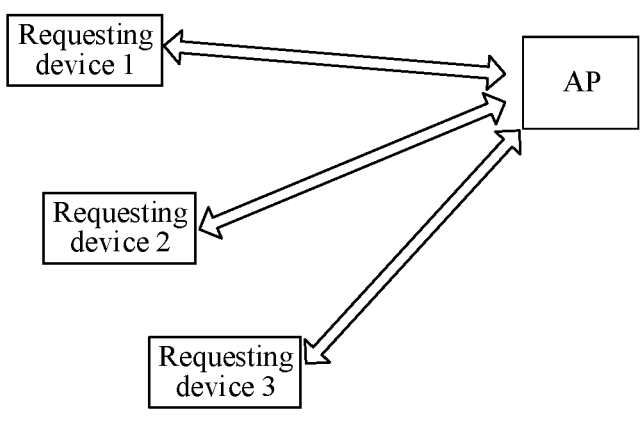

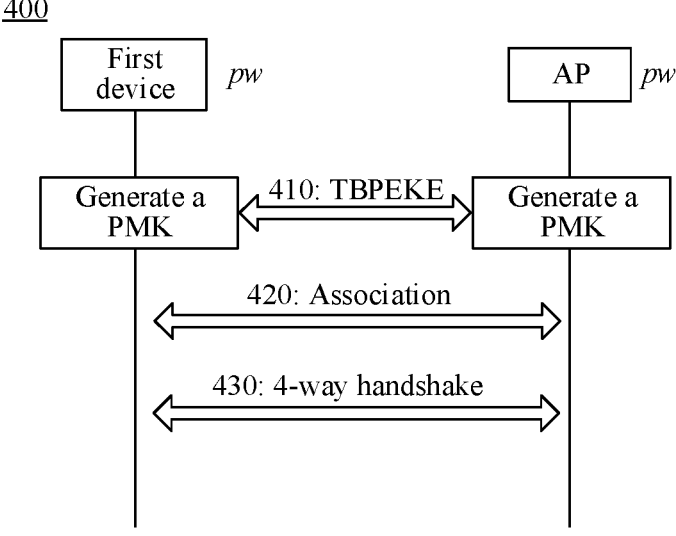

Cyclic group $G$ whose order is a prime $p$, $U$, $V \xleftarrow{R} G$, and H:$\{0, 1\}^{*} \xrightarrow{R} \{0, 1\}^{l}$ $g \leftarrow U \cdot V^{pw}$, $x \xleftarrow{R} Z_p^{*}$, $X \leftarrow g^{x}$ $\xrightarrow{\quad A\|X \quad}$ $\xleftarrow{\quad Y \quad}$ $g \leftarrow U \cdot V^{pw}$, $y \xleftarrow{R} Z_p^{*}$, $Y \leftarrow g^{y}$ $Z \leftarrow Y^{x}$                                        $Z \leftarrow X^{y}$ $sk \leftarrow H(\text{A}\|\text{B}\|g\|X\|Y\|Z)$

SECURITY AUTHENTICATION METHOD AND APPARATUS APPLIED TO WI-FI

CROSS-REFERENCE TO RELATED APPLICATIONS

This application is a continuation of International Application No. PCT/CN2020/131854, filed on Nov. 26, 2020, the disclosure of which is hereby incorporated by reference in its entirety.

TECHNICAL FIELD

This application relates to the communication field, and more specifically, to a security authentication method and apparatus applied to wireless fidelity (Wi-Fi).

BACKGROUND

Wi-Fi is a wireless local area network technology created based on an IEEE 802.11 standard and is widely used in scenarios of home and public places (for example, shopping malls and companies). A security protocol is a basis of the Wi-Fi and controls who can use the network. Specifically, the Wi-Fi security protocol enables a supplicant and an access point (AP) to perform mutual authentication and generate a session key and a group transient key (GTK). The session key can be used for protecting subsequent unicast communications between the supplicant and the AP, and the group transient key is for protecting broadcast communication of the AP.

In the Wi-Fi security protocol, both the supplicant and the AP share a password (pw). Both the supplicant and the AP may derive a pairwise master key (PMK) based on respective passwords. Further, both the supplicant and the AP may perform identity authentication and calculate a pairwise transient key (PTK) based on the PMK, and the AP may transfer the group transient key to the supplicant. The PTK includes a transient key TK, namely, the session key.

The most current Wi-Fi security protocol is third generation Wi-Fi protected access (WPA3). In a WPA3 version, both a supplicant and an AP may perform simultaneous authentication of equals (SAE), and use a shared password with a low entropy value to implement mutual identity authentication and generate a shared key with a high entropy value, to avoid brute force cracking of the password. However, the current WPA3 version cannot effectively prevent a side channel attack or a denial of service (DoS) attack.

SUMMARY

This application provides a security authentication method and apparatus applied to Wi-Fi, which can help an AP and a first device avoid a side channel attack during security authentication.

According to a first aspect, a security authentication method applied to Wi-Fi is provided. The method may be applied to an access point AP, for example, performed by the AP or a component (for example, a chip or a circuit) that can be configured in the AP.

In the method, the access point AP negotiates, based on a password, a pairwise master key PMK with a first device based on a twin base password encrypted key exchange TBPEKE protocol, where the password is a shared key between the AP and the first device; and then the AP performs a 4-way handshake with the first device based on the PMK.

Therefore, in this embodiment of this application, a PMK with a high entropy value can be generated by performing a TBPEKE procedure, so that the security authentication method provided in this embodiment of this application can help resist an offline dictionary attack. In addition, because TBPEKE can easily avoid a side channel attack, in this embodiment of this application, the PMK is generated by executing the TBPEKE, which can improve anti-side channel attack capabilities of the AP and the first device in a security authentication process of Wi-Fi, and help the AP and the first device avoid the side channel attack during security authentication.

The TBPEKE is also a PAKE protocol. In some embodiments, an SAE procedure in an existing WPA3 security protocol may be replaced with the TBPEKE procedure, to generate the PMK with the high entropy value.

With reference to the first aspect, in some implementations of the first aspect, the foregoing PMK includes a first PMK1 and a second PMK2.

That the access point AP negotiates, based on a password, a pairwise master key PMK with a first device based on a twin base password encrypted key exchange TBPEKE protocol may be specifically implemented in the following manner.

The AP obtains a first parameter X from the first device, where the first parameter X is determined based on a hash-to-curve function g, the hash-to-curve function g is for converting the password into a point on an elliptic curve through a point multiplication operation, $X=g^x$, and x is a random number. Then, the AP sends a second parameter Y to the first device, to indicate the first device to calculate the first PMK1 based on the first parameter X and the second parameter Y, where the second parameter Y is determined based on the hash-to-curve function g, $Y=g^y$, and y is a random number. Then, the AP calculates the second PMK2 based on the first parameter X and the second parameter Y.

Therefore, in this embodiment of this application, the first device may send the first parameter X to the AP, and the AP may send the second parameter Y to the first device, where the first parameter X and the second parameter Y are separately determined based on the hash-to-curve function g. Further, the first device may calculate the PMK1 based on the first parameter X and the second parameter Y, and the AP may calculate the PMK2 based on the first parameter X and the second parameter Y. In this embodiment of this application, the first parameter X and the second parameter Y that are transmitted between the AP and the first device are generated based on the hash-to-curve function g and the random number, and do not involve calculation of the password. Therefore, it is very difficult for an attacker to know the password, which can improve anti-side channel attack capabilities of the AP and the first device in a security authentication process of Wi-Fi, and help the AP and the first device avoid a side channel attack during security authentication.

However, in the conventional technology, when an SAE procedure is used in a WPA3 protocol to calculate a PMK, a shared password needs to be used for calculation. In this way, through channel testing and with reference to brute force cracking and other means, the attacker can obtain the password, causing the password to be compromised.

With reference to the first aspect, in some implementations of the first aspect, before the access point AP negotiates, based on a password, a pairwise master key PMK with a first device based on a twin base password encrypted key exchange TBPEKE protocol, the AP may further perform an association with the first device to agree on a to-be-used security suite, where the security suite indicates the hash-to-curve function g.

When the first PMK1 is the same as the second PMK2, the AP may perform the 4-way handshake with the first device based on the PMK.

With reference to the first aspect, in some implementations of the first aspect, that the AP performs a 4-way handshake with the first device based on the PMK may be specifically implemented in the following manner.

The AP sends a first message to the first device, where the first message indicates the first device to generate a first pairwise transient key PTK1, the first message includes a nonce of the AP, the first PTK1 is generated based on the first PMK1, the nonce of the AP, and a nonce of the first device, and the first PTK1 includes a first key confirmation key KCK1, a first key encryption key KEK1, and a first transient key TK1. Then, the AP obtains a second message from the first device, where the message integrity of the second message is protected by using the first KCK1, and the second message includes the nonce of the first device. The AP generates a second PTK2 based on the second PMK2, the nonce of the AP, and the nonce of the first device, where the second PTK2 includes a second KCK2, a second KEK2, and a second TK2. Then, the AP sends a third message to the first device, where the third message includes a group transient key GTK, privacy of the GTK of the third message is protected by using the second KEK2, and the message integrity of the third message is protected by using the second KCK2. The AP obtains a fourth message from the first device, where the fourth message is for responding to the third message, and the message integrity of the fourth message is protected by using the second KCK2.

Therefore, both the AP and the first device can perform, based on the PMK, identity authentication through a 4-way handshake process, and generate a session key and a group transient key, to protect subsequent unicast communications between a requesting device and the AP and broadcast communication of the AP.

It should be noted that, when the first PTK1 is the same as the second PTK2, the AP can successfully perform the 4-way handshake with the first device.

Optionally, before the performing a 4-way handshake with the first device based on the PMK, the AP may further perform an association once to agree on a to-be-used security suite. For example, the security suite may indicate an encryption algorithm and other related parameters used in the 4-way handshake process. Specifically, for the association and 4-way handshake process, refer to descriptions in the conventional technology. Details are not described again.

In some embodiments, the requesting device may send a first connection request to the AP, where the first connection request includes the first parameter X. Correspondingly, the AP receives the first connection request. In response to the first connection request, the AP may perform the foregoing security authentication procedure with the first device.

With reference to the first aspect, in some implementations of the first aspect, that the AP calculates the second PMK2 based on the first parameter X and the second parameter Y may be specifically that the AP calculates the second PMK2 based on the first parameter X, the second parameter Y, an ID of the first device, and an ID of the AP.

As an example, the AP may calculate the PMK2 based on the following formula:

$$PMK2=KDF(Z,id_{dev}\|id_{AP}\|X\|Y).$$

4

For the AP, $Z=X^y$, $id_{dev}$ represents the ID of the first device, $id_{AP}$ represents the ID of the AP, and KDF( ) is a standard key derivation function.

As an example, the ID of the first device may be a MAC address of the first device, and the ID of the AP may be a MAC address of the AP. This is not limited in this application.

Before some optional embodiments, the AP may further send a broadcast message, where the broadcast message includes the ID of the AP. Correspondingly, the requesting device may receive the broadcast message, and obtain the ID of the AP from the broadcast message.

With reference to the first aspect, in some implementations of the first aspect, the foregoing hash-to-curve function g is represented as:

$$g=U \cdot V^{pw}.$$

U and V are two independent random generating elements obtained from a cyclic group G whose order is a prime p, and pw represents the password.

The hash-to-curve function g is a function obtained based on the TBPEKE.

Optionally, the broadcast message may further include RSNEwithsupp. ciphers, to notify capabilities of the ciphers. Correspondingly, the first device selects a matched cipher, that is, selects a cipher suite supported by the first device, to obtain the foregoing g, or obtain related parameters (for example, U and V) of g. After the first device selects the cipher suite, g, or U and V may be stored on a first device side as a system parameter(s). That the AP broadcasts RSNEwithsupp. ciphers (robust security network element with supported ciphers) and the first device selects a matched cipher may be an example in which the AP performs an association with the first device to agree on the to-be-used security suite.

With reference to the first aspect, in some implementations of the first aspect, the foregoing hash-to-curve function g is pre-stored locally in the AP.

In other words, an AP end may retain: $g=U \cdot V^{pw}$ instead of the password pw. Therefore, in this embodiment of this application, the AP end directly retains: $g=U \cdot V^{pw}$ instead of the password pw, so that the AP can be prevented from calculating g in real time during device authentication, which can reduce a calculation amount of the AP end, and then help reduce or avoid a denial of service (DoS) attack on the AP.

With reference to the first aspect, in some implementations of the first aspect, the second parameter Y is generated by the AP based on the hash-to-curve function g. In other words, when the AP receives the first parameter X sent by the first device, the AP may generate the second parameter Y based on the pre-stored hash-to-curve function g, and does not need to generate the hash-to-curve function g based on the password pw.

Alternatively, in some implementations, the second parameter Y is determined by the AP by reusing a second parameter Y sent to a second device. In addition, because $Y=g^y$, that the AP end reuses the second parameter Y may also be equivalent to the AP end reusing the random number y. This is not limited in this application.

Therefore, in this embodiment of this application, the AP end reuses the second parameter Y or the random number y, so that the AP can be prevented from calculating the second parameter Y in real time during device authentication, which can reduce a calculation amount of the AP end, and then help reduce or avoid a DoS attack on the AP.

With reference to the first aspect, in some implementations of the first aspect, before the sending a second parameter Y to the first device, the AP may further obtain an identifier ID of the first device from the first device, and then send a token for an anti-DoS service to the first device. The token is determined based on the identifier ID of the first device and a key k. Then, the AP receives the token and the ID of the first device from the first device, and performs verification on the token based on the ID of the first device and the key k.

When the token sent by the first device is verified, the AP processes a connection request of the first device. When the token is unsuccessfully verified, the AP does not process the connection request of the first device.

Therefore, in this embodiment of this application, the AP may send, to the first device, the anti-DoS token bound to the ID of the first device, and the first device needs to send the ID of the first device and the token to the AP again, so that the AP can perform verification on the received ID of the first device and the corresponding token, and process the connection request of the first device only when the token is verified, which can help prevent the AP from processing all connection requests, and then help reduce or avoid a DoS attack on the AP.

As an example, the first device may send a second connection request to the AP, where the second connection request may include the first parameter X, the identifier ID of the first device, and the foregoing token. Correspondingly, the AP receives the second connection request.

As an example, the identifier ID of the first device may be a MAC address of the first device. A data frame format of the second connection request may include the MAC address of the first device.

With reference to the first aspect, in some implementations of the first aspect, before the sending a second parameter Y to the first device, it may be further determined that a first list does not include the ID of the first device, where the first list includes an ID of at least one device connected to a network provided by the AP.

As an example, the first list may be a list of DEVinPROC.

Therefore, in this embodiment of this application, the AP further processes the connection request of the first device only when determining that the ID of the first device is not in the first list, which can help prevent the AP from processing all connection requests, help reduce a calculation amount of the AP end, and then help reduce or avoid a DoS attack on the AP.

With reference to the first aspect, in some implementations of the first aspect, the ID of the first device may be further added to the first list.

In this way, the first list can be updated. Further, when the connection request that includes the ID of the first device is subsequently received, because the ID is already included in the first list, the AP may not process the connection request, which can help reduce or avoid a DoS attack on the AP.

According to a second aspect, a security authentication method applied to Wi-Fi is provided. The method may be applied to a first device, for example, performed by the first device or a component (for example, a chip or a circuit) that can be configured in the first device.

In the method, the first device negotiates, based on a password, a pairwise master key PMK with an access point AP based on a twin base password encrypted key exchange TBPEKE protocol, where the password is a shared key between the AP and the first device; and then, the first device performs a 4-way handshake with the AP based on the PMK.

With reference to the second aspect, in some implementations of the second aspect, the PMK includes a first PMK1 and a second PMK2, and that the first device negotiates, based on a password, a pairwise master key PMK with an access point AP based on a twin base password encrypted key exchange TBPEKE protocol may be specifically implemented in the following manner.

The first device sends a first parameter X to the AP, where the first parameter X is determined based on a hash-to-curve function g, the hash-to-curve function g is for converting the password into a point on an elliptic curve through a point multiplication operation, $X=g^x$, and x is a random number. The first device obtains a second parameter Y from the AP, where the second parameter Y is determined based on the hash-to-curve function g, $Y=g^y$, y is a random number, and the first parameter X and the second parameter Y are used by the AP to calculate the second PMK2. The first device calculates the first PMK1 based on the first parameter X and the second parameter Y.

With reference to the second aspect, in some implementations of the second aspect, before the first device negotiates, based on a password, a pairwise master key PMK with an AP based on a twin base password encrypted key exchange TBPEKE protocol, the first device may further perform an association with the AP to agree on a to-be-used security suite, where the security suite indicates the hash-to-curve function g.

With reference to the second aspect, in some implementations of the second aspect, that the first device performs a 4-way handshake with the AP based on the PMK may be specifically implemented in the following manner.

The first device receives a first message from the AP, where the first message includes a nonce of the AP. The first device generates a first pairwise transient key PTK1 based on the first PMK1, the nonce of the AP, and a nonce of the first device, where the first PTK1 includes a first key confirmation key KCK1, a first key encryption key KEK1, and a first transient key TK1. The first device sends a second message to the AP, where the message integrity of the second message is protected by using the first KCK1, the second message includes the nonce of the first device, the second message indicates the AP to generate a second PTK2, the second PTK2 is generated based on the second PMK2, the nonce of the AP, and the nonce of the first device, and the second PTK2 includes a second KCK2, a second KEK2, and a second TK2. The first device obtains a third message from the AP, where the third message includes a group transient key GTK, privacy of the GTK of the third message is protected by using the second KEK2, and the message integrity of the third message is protected by using the second KCK2. The first device sends a fourth message to the AP, where the fourth message is for responding to the third message, and the message integrity of the fourth message is protected by using a KCK.

With reference to the second aspect, in some implementations of the second aspect, the hash-to-curve function g is represented as:

$$g=U \cdot V^{pw}.$$

U and V are two independent random generating elements obtained from a cyclic group G whose order is a prime p, and pw represents the password.

With reference to the second aspect, in some implementations of the second aspect, before the receiving a second parameter Y from the AP, an identifier ID of the first device may be further sent to the AP, and then a token for an anti-DoS service is received from the AP, where the token is generated based on a key k and the ID of the first device. Then, the token and an ID of a requesting device may be sent to the AP.

With reference to the second aspect, in some implementations of the second aspect, the ID of the first device includes a MAC address of the first device.

According to a third aspect, a security authentication apparatus applied to Wi-Fi is provided, and is configured to perform the method according to the first aspect or any possible implementation of the first aspect. Specifically, the apparatus includes units or modules configured to perform the method according to the first aspect or any possible implementation of the first aspect. For example, the apparatus includes a processing unit and a transceiver unit.

The processing unit may negotiate, based on a password, a pairwise master key PMK with a first device based on a twin base password encrypted key exchange TBPEKE protocol, where the password is a shared key between an AP and the first device. For example, the processing unit may negotiate with the first device by using the transceiver unit.

The processing unit may further perform a 4-way handshake with the first device based on the PMK. For example, the processing unit may perform the 4-way handshake with the first device by using the transceiver unit.

With reference to the third aspect, in some implementations of the third aspect, the PMK includes a first PMK1 and a second PMK2.

The transceiver unit is configured to obtain a first parameter X from the first device, where the first parameter X is determined based on a hash-to-curve function g, the hash-to-curve function g is for converting the password into a point on an elliptic curve through a point multiplication operation, $X=g^x$, and x is a random number.

The transceiver unit is further configured to send a second parameter Y to the first device, to indicate the first device to calculate the first PMK1 based on the first parameter X and the second parameter Y, where the second parameter Y is determined based on the hash-to-curve function g, $Y=g^y$, and y is a random number.

The processing unit is configured to calculate the second PMK2 based on the first parameter X obtained by the transceiver unit and the second parameter Y.

With reference to the third aspect, in some implementations of the third aspect, the processing unit is further configured to perform an association with the first device to agree on a to-be-used security suite, where the security suite indicates the hash-to-curve function g.

With reference to the third aspect, in some implementations of the third aspect, the transceiver unit is configured to send a first message to the first device, where the first message indicates the first device to generate a first pairwise transient key PTK1, the first message includes a nonce of the AP, the first PTK1 is generated based on the first PMK1, the nonce of the AP, and a nonce of the first device, and the first PTK1 includes a first key confirmation key KCK1, a first key encryption key KEK1, and a first transient key TK1.

The transceiver unit is further configured to obtain a second message from the first device, where the message integrity of the second message is protected by using the first KCK1, and the second message includes the nonce of the first device.

The processing unit is further configured to generate a second PTK2 based on the second PMK2, the nonce of the AP, and the nonce of the first device, where the second PTK2 includes a second KCK2, a second KEK2, and a second TK2.

The transceiver unit is further configured to send a third message to the first device, where the third message includes a group transient key GTK, privacy of the GTK of the third message is protected by using the second KEK2, and the message integrity of the third message is protected by using the second KCK2.

The transceiver unit is further configured to obtain a fourth message from the first device, where the fourth message is for responding to the third message, and the message integrity of the fourth message is protected by using the second KCK2.

With reference to the third aspect, in some implementations of the third aspect, the hash-to-curve function g is represented as:

$$g = U \cdot V^{pw}.$$

U and V are two independent random generating elements obtained from a cyclic group G whose order is a prime p, and pw represents the password.

With reference to the third aspect, in some implementations of the third aspect, the hash-to-curve function g is pre-stored locally in the AP.

With reference to the third aspect, in some implementations of the third aspect, the second parameter Y is generated by the AP based on the hash-to-curve function g; or the second parameter Y is determined by the AP by reusing a second parameter Y sent to a second device.

With reference to the third aspect, in some implementations of the third aspect, the transceiver unit is further configured to obtain an identifier ID of the first device from the first device, and send a token for an anti-DoS service to the first device, where the token is determined based on the identifier ID of the first device and a key k.

The transceiver unit is further configured to obtain the token and the ID of the first device from the first device.

The processing unit is further configured to perform verification on the token based on the ID of the first device and the key k.

With reference to the third aspect, in some implementations of the third aspect, the processing unit is further configured to determine that a first list does not include the ID of the first device, where the first list includes an ID of at least one device connected to a network provided by the AP.

With reference to the third aspect, in some implementations of the third aspect, the processing unit is further configured to add the ID of the first device to the first list.

With reference to the third aspect, in some implementations of the third aspect, the ID of the first device includes a MAC address of the first device.

According to a fourth aspect, a security authentication apparatus applied to Wi-Fi is provided, and is configured to perform the method according to the second aspect or any possible implementation of the second aspect. Specifically, the apparatus includes units or modules configured to perform the method according to the second aspect or any possible implementation of the second aspect. For example, the apparatus includes a processing unit and a transceiver unit.

The processing unit may negotiate, based on a password, a pairwise master key PMK with an access point AP based on a twin base password encrypted key exchange TBPEKE protocol, where the password is a shared key between the AP and a first device. For example, the processing unit may negotiate with the AP by using the transceiver unit.

The processing unit may further perform a 4-way handshake with the AP based on the PMK. For example, the processing unit may perform the 4-way handshake with the first device by using the transceiver unit.

With reference to the fourth aspect, in some implementations of the fourth aspect, the PMK includes a first PMK1 and a second PMK2.

The transceiver unit is configured to send a first parameter X to the AP, where the first parameter X is determined based on a hash-to-curve function g, the hash-to-curve function g is for converting the password into a point on an elliptic curve through a point multiplication operation, $X=g^x$, and x is a random number.

The transceiver unit is further configured to obtain a second parameter Y from the AP, where the second parameter Y is determined based on the hash-to-curve function g, $Y=g^y$, y is a random number, and the first parameter X and the second parameter Y are used by the AP to calculate the second PMK2.

The processing unit is configured to calculate the first PMK1 based on the first parameter X and the second parameter Y.

With reference to the fourth aspect, in some implementations of the fourth aspect, the processing unit is further configured to perform an association with the AP to agree on a to-be-used security suite, where the security suite indicates the hash-to-curve function g.

With reference to the fourth aspect, in some implementations of the fourth aspect, the transceiver unit is further configured to receive a first message from the AP, where the first message includes a nonce of the AP.

The processing unit is further configured to generate, by the first device, a first pairwise transient key PTK1 based on the first PMK1, the nonce of the AP, and a nonce of the first device, where the first PTK1 includes a first key confirmation key KCK1, a first key encryption key KEK1, and a first transient key TK1.

The transceiver unit is further configured to send a second message to the AP, where the message integrity of the second message is protected by using the first KCK1, the second message includes the nonce of the first device, the second message indicates the AP to generate a second PTK2, the second PTK2 is generated based on the second PMK2, the nonce of the AP, and the nonce of the first device, and the second PTK2 includes a second KCK2, a second KEK2, and a second TK2.

The transceiver unit is further configured to obtain a third message from the AP, where the third message includes a group transient key GTK, privacy of the GTK of the third message is protected by using the second KEK2, and the message integrity of the third message is protected by using the second KCK2.

The transceiver unit is further configured to send a fourth message to the AP, where the fourth message is for responding to the third message, and the message integrity of the fourth message is protected by using a KCK.

With reference to the fourth aspect, in some implementations of the fourth aspect, the hash-to-curve function g is represented as:

$$g=U \cdot V^{pw}.$$

U and V are two independent random generating elements obtained from a cyclic group G whose order is a prime p, and pw represents the password.

With reference to the fourth aspect, in some implementations of the fourth aspect, the transceiver unit is further configured to send an identifier ID of the first device to the AP.

The transceiver unit is further configured to receive a token for an anti-denial of service DoS service from the AP, where the token is generated based on a key k and the ID of the first device.

The transceiver unit is further configured to send the token and an ID of a requesting device to the AP.

With reference to the fourth aspect, in some implementations of the fourth aspect, the ID of the first device includes a MAC address of the first device.

According to a fifth aspect, a security authentication apparatus applied to Wi-Fi is provided, including a processor and a transceiver. Optionally, the apparatus may further include a memory. The processor is configured to execute instructions stored in the memory. When the processor executes the instructions stored in the memory, the execution enables the processor to perform the method according to the first aspect or any possible implementation of the first aspect.

The processor is coupled to the transceiver and is configured to negotiate, based on a password, a pairwise master key PMK with a first device based on a twin base password encrypted key exchange TBPEKE protocol, where the password is a shared key between an AP and the first device; and perform a 4-way handshake with the first device based on the PMK.

With reference to the fifth aspect, in some implementations of the fifth aspect, the PMK includes a first PMK1 and a second PMK2, and the processor is further configured to indicate the transceiver to obtain a first parameter X from the first device, where the first parameter X is determined based on a hash-to-curve function g, the hash-to-curve function g is for converting the password into a point on an elliptic curve through a point multiplication operation, $X=g^x$, and x is a random number; indicate the transceiver to send a second parameter Y to the first device, to indicate the first device to calculate the first PMK1 based on the first parameter X and the second parameter Y, where the second parameter Y is determined based on the hash-to-curve function g, $Y=g^y$, and y is a random number; and calculate the second PMK2 based on the first parameter X and the second parameter Y.

With reference to the fifth aspect, in some implementations of the fifth aspect, the processor is further configured to perform an association with the first device to agree on a to-be-used security suite, where the security suite indicates the hash-to-curve function g.

With reference to the fifth aspect, in some implementations of the fifth aspect, the processor is further configured to indicate the transceiver to send a first message to the first device, where the first message indicates the first device to generate a first pairwise transient key PTKT, the first message includes a nonce of the AP, the first PTK1 is generated based on the first PMK1, the nonce of the AP, and a nonce of the first device, and the first PTK1 includes a first key confirmation key KCK1, a first key encryption key KEK1, and a first transient key TK1.

The processor is further configured to indicate the transceiver to obtain a second message from the first device, where the message integrity of the second message is protected by using the first KCK1, and the second message includes the nonce of the first device; and generate a second PTK2 based on the second PMK2, the nonce of the AP, and the nonce of the first device, where the second PTK2 includes a second KCK2, a second KEK2, and a second TK2.

The processor is further configured to indicate the transceiver to send a third message to the first device, where the third message includes a group transient key GTK, privacy of the GTK of the third message is protected by using the second KEK2, and the message integrity of the third message is protected by using the second KCK2.

The processor is further configured to indicate the transceiver to obtain a fourth message from the first device, where the fourth message is for responding to the third message, and the message integrity of the fourth message is protected by using the second KCK2.

With reference to the fifth aspect, in some implementations of the fifth aspect, the hash-to-curve function g is represented as:

$$g = U \cdot V^{pw}.$$

U and V are two independent random generating elements obtained from a cyclic group G whose order is a prime p, and pw represents the password.

With reference to the fifth aspect, in some implementations of the fifth aspect, the hash-to-curve function g is pre-stored locally in the AP.

With reference to the fifth aspect, in some implementations of the fifth aspect, the second parameter Y is generated by the AP based on the hash-to-curve function g; or the second parameter Y is determined by the AP by reusing a second parameter Y sent to a second device.

With reference to the fifth aspect, in some implementations of the fifth aspect, the processor is further configured to indicate the transceiver to obtain an identifier ID of the first device from the first device, and indicate the transceiver to send a token for an anti-DoS service to the first device, where the token is determined based on the identifier ID of the first device and a key k.

The processor is further configured to indicate the transceiver to obtain the token and the ID of the first device from the first device, and perform verification on the token based on the ID of the first device and the key k.

With reference to the fifth aspect, in some implementations of the fifth aspect, the processor is further configured to determine that a first list does not include the ID of the first device, where the first list includes an ID of at least one device connected to a network provided by the AP.

With reference to the fifth aspect, in some implementations of the fifth aspect, the processor is further configured to add the ID of the first device to the first list.

With reference to the fifth aspect, in some implementations of the fifth aspect, the ID of the first device includes a MAC address of the first device.

According to a sixth aspect, a security authentication apparatus applied to Wi-Fi is provided, including a processor and a transceiver. Optionally, the apparatus may further include a memory. The processor is configured to execute instructions stored in the memory. When the processor executes the instructions stored in the memory, the execution enables the processor to perform the method according to the second aspect or any possible implementation of the second aspect.

The processor is coupled to the transceiver and is configured to negotiate, based on a password, a pairwise master key PMK with an access point AP based on a twin base password encrypted key exchange TBPEKE protocol, where the password is a shared key between the AP and a first device; and perform a 4-way handshake with the AP based on the PMK.

With reference to the sixth aspect, in some implementations of the sixth aspect, the PMK includes a first PMK1 and a second PMK2.

The processor is further configured to indicate the transceiver to send a first parameter X to the AP, where the first parameter X is determined based on a hash-to-curve function g, the hash-to-curve function g is for converting the password into a point on an elliptic curve through a point multiplication operation, $X = g^x$, and x is a random number.

The processor is further configured to indicate the transceiver to obtain a second parameter Y from the AP, where the second parameter Y is determined based on the hash-to-curve function g, $Y = g^y$, y is a random number, and the first parameter X and the second parameter Y are used by the AP to calculate the second PMK2.

The processor is further configured to calculate the first PMK1 based on the first parameter X and the second parameter Y.

With reference to the sixth aspect, in some implementations of the sixth aspect, the processor is further configured to perform an association with the AP to agree on a to-be-used security suite, where the security suite indicates the hash-to-curve function g.

With reference to the sixth aspect, in some implementations of the sixth aspect, the processor is further configured to indicate the transceiver to receive a first message from the AP, where the first message includes a nonce of the AP; and generate a first pairwise transient key PTK1 based on the first PMK1, the nonce of the AP, and a nonce of the first device, where the first PTK1 includes a first key confirmation key KCK1, a first key encryption key KEK1, and a first transient key TK1.

The processor is further configured to indicate the transceiver to send a second message to the AP, where the message integrity of the second message is protected by using the first KCK1, the second message includes the nonce of the first device, the second message indicates the AP to generate a second PTK2, the second PTK2 is generated based on the second PMK2, the nonce of the AP, and the nonce of the first device, and the second PTK2 includes a second KCK2, a second KEK2, and a second TK2.

The processor is further configured to indicate the transceiver to obtain a third message from the AP, where the third message includes a group transient key GTK, privacy of the GTK of the third message is protected by using the second KEK2, and the message integrity of the third message is protected by using the second KCK2.

The processor is further configured to indicate the transceiver to send a fourth message to the AP, where the fourth message is for responding to the third message, and the message integrity of the fourth message is protected by using a KCK.

With reference to the sixth aspect, in some implementations of the sixth aspect, the hash-to-curve function g is represented as:

$$g = U \cdot V^{pw}.$$

U and V are two independent random generating elements obtained from a cyclic group G whose order is a prime p, and pw represents the password.

With reference to the sixth aspect, in some implementations of the sixth aspect, the processor is further configured to indicate the transceiver to send an identifier ID of the first device to the AP.

The processor is further configured to indicate the transceiver to receive a token for an anti-denial of service DoS service from the AP, where the token is generated based on a key k and the ID of the first device.

The processor is further configured to indicate the transceiver to send the token and an ID of a requesting device to the AP.

With reference to the sixth aspect, in some implementations of the sixth aspect, the ID of the first device includes a MAC address of the first device.

According to a seventh aspect, a security authentication chip applied to Wi-Fi is provided, including a processor and a communication interface. The processor is configured to invoke instructions from the communication interface and run the instructions. When the processor executes the instructions, the method according to any one of the first aspect and the second aspect or any possible implementation of any one of the first aspect and the second aspect is implemented.

Optionally, the chip may further include a memory. The memory stores instructions. The processor is configured to execute the instructions stored in the memory or other instructions. When the instructions are executed, the processor is configured to implement the method according to any one of the first aspect and the second aspect or any possible implementation of any one of the first aspect and the second aspect.

According to an eighth aspect, a computer-readable medium is provided. The computer-readable medium is configured to store a computer program. The computer program includes instructions configured to perform the method according to any one of the first aspect and the second aspect or any possible implementation of any one of the first aspect and the second aspect.

According to a ninth aspect, an embodiment of this application further provides a computer program product including instructions. When the computer program product is run on a computer, the computer is enabled to perform the method according to any one of the first aspect and the second aspect or any possible implementation of any one of the first aspect and the second aspect.

According to a tenth aspect, a communication system is provided. The communication system includes an apparatus having functions for implementing the methods and various possible designs in the first aspect, and an apparatus having functions for implementing the methods and various possible designs in the second aspect.

It should be understood that, for beneficial effects achieved in the second aspect to the ninth aspect and the corresponding implementations of this application, refer to beneficial effects achieved in the first aspect and the corresponding implementations of this application. Details are not described again.

BRIEF DESCRIPTION OF DRAWINGS

FIG. 3 is a schematic diagram of an application scenario to which an embodiment of this application is applied;

FIG. 4 is a schematic flowchart of a security authentication method applied to Wi-Fi according to an embodiment of this application;

FIG. 5 shows an example of a TBPEKE procedure;

DESCRIPTION OF EMBODIMENTS

The following describes technical solutions of this application with reference to accompanying drawings.

Figure 1:
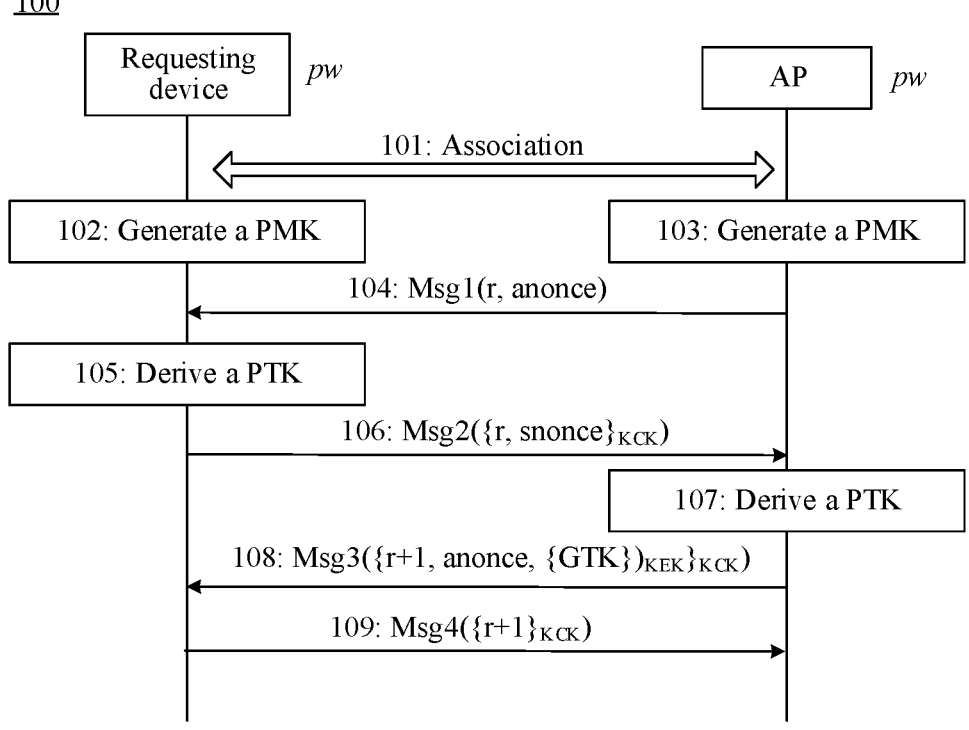
FIG. 1 is a schematic flowchart of a Wi-Fi-based security authentication method.

FIG. 1 is a schematic flowchart of a Wi-Fi-based security authentication method 100. In FIG. 1, a Wi-Fi security protocol may be a second generation Wi-Fi protected access (WPA2) version, or a version earlier than WPA2, for example, wired equivalent privacy (WEP), second generation WEP (WEP2), or WPA. This is not limited.

A procedure shown in FIG. 1 may also be referred to as a security protocol procedure. As shown in FIG. 1, the method 100 is performed by a requesting device (which may also be replaced with a supplicant) and an AP. The AP may provide a network based on the Wi-Fi protocol, and the requesting device is a terminal device that requests to use the network provided by the AP. Both the AP and the requesting device share a password pw. Refer to FIG. 1. The method 100 may include steps 101 to 109. Steps 104 to 109 may be referred to as a 4-way handshake process.

101: The requesting device performs an association with the AP. The requesting device and the AP may agree on a to-be-used security suite through the association. For example, the security suite may indicate a related encryption algorithm and other related parameters used between the requesting device and the AP.

102: The requesting device generates a PMK. For example, the requesting device may derive the PMK based on the pw shared by both the requesting device and the AP. Optionally, the requesting device may alternatively obtain the PMK based on media access control (MAC) addresses of both the requesting device and the AP. This is not limited in this application.

103: The AP generates a PMK. For example, the AP may derive the PMK based on the pw shared by both the requesting device and the AP Optionally, the AP may alternatively obtain the PMK based on the MAC addresses of both the requesting device and the AP. This is not limited in this application.

In some embodiments, when the PMK generated by the requesting device is the same as the PMK generated by the AP, the AP may perform a 4-way handshake with the requesting device based on the PMK.

104: The AP sends Msg1 (r,anonce) to the requesting device. Correspondingly, the requesting device receives Msg1 (r,anonce). Msg1 represents a message1, anonce represents a nonce of the AP, and r represents a count of a counter.

105: The requesting device derives a PTK.

For example, the requesting device may select a nonce (represented as snonce), and generate the PTK based on the PMK, anonce, and snonce. Optionally, the requesting device may alternatively generate the PTK based on the PMK, anonce, snonce, and the MAC addresses of both the requesting device and the AP. This is not limited in this application.

For example, the PTK includes three parts: a key confirmation key (KCK), a key encryption key (KEK), and a transient key (TK), respectively. The KCK is for protecting the message privacy in the 4-way handshake process, the KEK is for protecting the message integrity in the 4-way handshake process, and the TK is a true session key and is for protecting subsequent communication between the requesting device and the AP.

106: The requesting device sends Msg2 ($\{r,snonce\}_{KCK}$) to the AP. Correspondingly, the AP receives Msg2 ($\{r, snonce\}_{KCK}$). Msg2 represents a message2 (message2), and the message integrity of Msg2 is protected by using the KCK.

107: The AP derives a PTK.

For example, the AP may generate the PTK based on the PMK, anonce, and snonce. Optionally, the AP may alternatively generate the PTK based on the PMK, anonce, snonce, and the MAC addresses of both the requesting device and the AP. This is not limited in this application.

In some embodiments, the PTK generated by the requesting device is the same as the PTK generated by the AP. When the PTK generated by the requesting device is the same as the PTK generated by the AP, the following procedure is performed.

108: The AP sends Msg3 ($\{r+1,anonce,\{GTK\}_{KEK}\}_{KCK}$) to the requesting device. Correspondingly, the AP receives Msg3 ($\{r+1,anonce,\{GTK\}_{KEK}\}_{KCK}$). Msg3 represents a message3, and a GTK is a group transient key. Privacy of the GTK of Msg3 is protected by using the KEK, and integrity of the entire message of Msg3 is protected by using the KCK.

108: The requesting device sends Msg4 ($\{r+1\}_{KCK}$) to the AP. Correspondingly, the AP receives Msg4 ($\{r+1\}_{KCK}$). Msg4 represents a message4. The message integrity of Msg4 is protected by using the KCK.

Specifically, for steps 101 to 108, refer to descriptions in the conventional technology. Details are not described again.

It can be known from the foregoing descriptions that both the AP and the requesting device can perform identity authentication through the 4-way handshake process, and generate a session key and a group transient key, to protect subsequent unicast communications between the requesting device and the AP and broadcast communications of the AP.

In the foregoing method 100, the PMK is calculated by using the password pw (or the password pw and the MAC addresses of both parties), while a prominent feature of the password pw is that the password pw has a small length, that is, has a low entropy value. Therefore, if an attacker intercepts a 4-way handshake message in a key generation process, the attacker may obtain the password in a manner of brute force cracking, threatening network security.

To resolve a potential risk that attackers in WPA2 and an earlier Wi-Fi security protocol version may perform brute force cracking on the password pw, a WPA3 version executes an SAE procedure before a conventional security protocol procedure (for example, an association and 4-way handshake procedure), to generate a PMK with a high entropy value, thereby helping to avoid brute force cracking of the password. SAE is a password-based password authenticated key exchange (PAKE) protocol.

Figure 2:
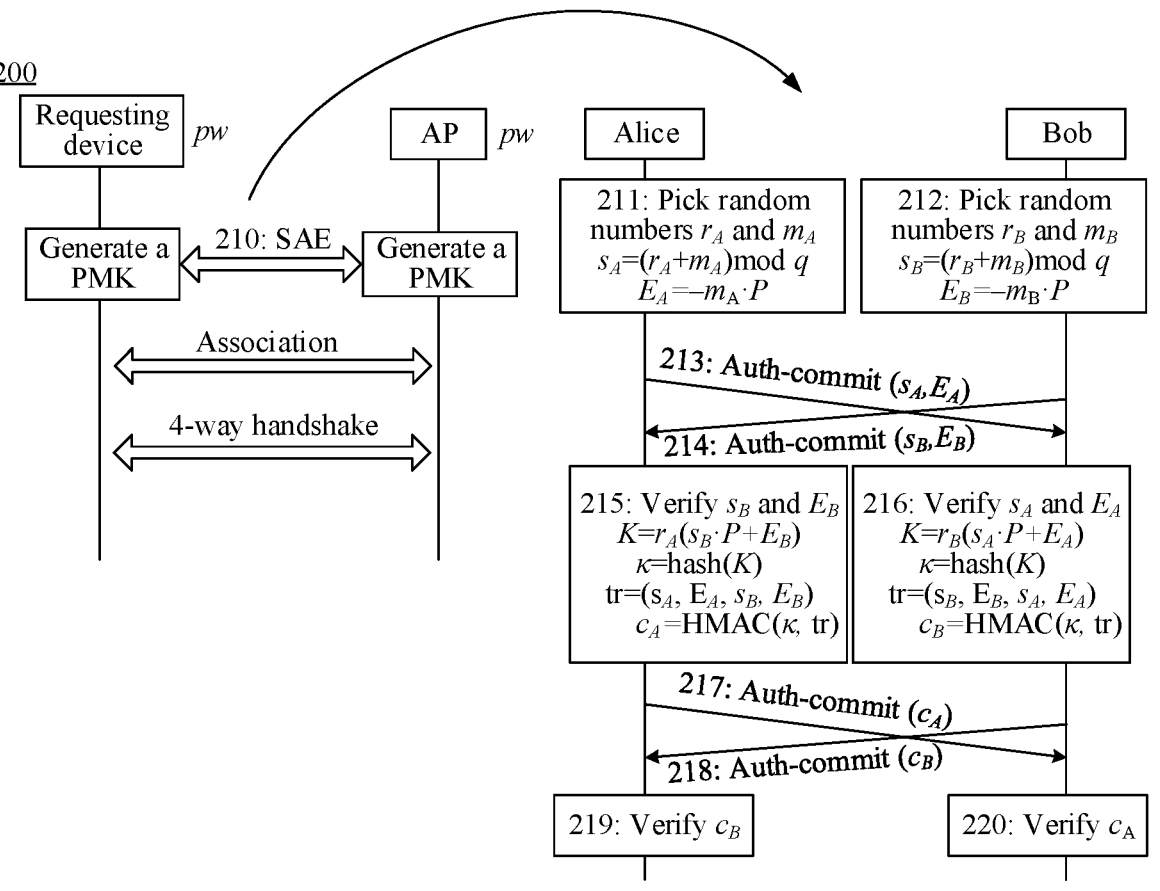
FIG. 2 is a schematic flowchart of a WPA3-based security authentication method.

FIG. 2 is a schematic flowchart of a WPA3-based security authentication method 200. The method 200 may include a PMK generation, association, and 4-way handshake process of both the requesting device and the AP. Different from the method 100, in FIG. 2, a PMK with a high entropy value is generated by performing an SAE procedure (namely, step 210), where SAE is implemented on an elliptic curve. As an example, in FIG. 2, an example in which both Alice (for example, a client) and Bob (for example, an AP) execute the SAE procedure is used for description. As shown in FIG. 2, step 210 includes steps 211 to 220.

211: Alice picks random numbers $r_A$ and $m_A$, and calculates: $s_A=(r_A+m_A)modq$, and $E_A=-m_A \cdot P$.

212: Bob picks random numbers $r_B$ and $m_B$, and calculates: $s_B(r_B+m_B)modq$, and $E_B=-m_B \cdot P$.

P is a point on a corresponding elliptic curve, and P may be derived by using a password pw and MAC addresses of a supplicant and an AP. A calculation process of generating P by using the password pw may be referred to as a hash-to-curve function.

213: Alice auth-commits ($s_A,E_A$) to Bob.

214: Bob auth-commits ($s_B,E_B$) to Alice.

215: Alice verifies $s_B$ and $E_B$, and calculates: $K=r_A(s_B \cdot P+ E_B)$, $\kappa=hash(K)$, $tr=(s_A,E_A,s_B,E_B)$, and $c_A=HMAC(\kappa, tr)$. That $\kappa=hash(K)$ may be used as a PMK.

216: Bob verifies $s_A$ and $E_A$, and calculates: $K=r_B(s_A \cdot P+ E_A)$, $\kappa=hash(K)$, $tr=(s_B,E_B,s_A,E_A)$, and $c_B=HMAC(\kappa, tr)$. That $\kappa=hash(K)$ may be used as a PMK.

217: Alice auth-commits $c_A$ to Bob.

218: Bob auth-commits $c_B$ to Alice.

219: Alice verifies $c_B$.

220: Bob verifies $c_A$.

After both $c_B$ and $c_A$ in steps 219 and 220 are verified, both Alice and Bob may use a respectively calculated K value as the PMK.

However, in the foregoing SAE procedure, the shared password pw needs to be used for calculation in a process of calculating P. Therefore, through channel testing and based on brute force cracking and other means, an attacker can obtain pw, causing the password to be compromised. In view of this, an embodiment of this application provides a communication solution. An AP and a first device (for example, a requesting device) negotiate, based on a password, a pairwise master key PMK based on a twin base password encrypted key exchange TBPEKE protocol; and perform a 4-way handshake based on the PMK. Because TBPEKE can easily avoid a side channel attack, in this embodiment of this application, the PMK is generated by executing the TBPEKE, which can improve anti-side channel attack capabilities of the AP and the first device in a security authentication process of Wi-Fi, and then help the AP and the first device avoid a side channel attack during security authentication.

FIG. 3 is a schematic diagram of an application scenario to which an embodiment of this application is applied. As shown in FIG. 3, a plurality of requesting devices (for example, a requesting device 1, a requesting device 2, and a requesting device 3) may be securely connected to an AP, and use Wi-Fi network resources though the AP. Each requesting device and the AP execute a security protocol, perform mutual authentication, and negotiate a key for protecting a communication channel between the requesting device and the AP Different requesting devices may use a same password to execute security protocols with the AP. The requesting device may be, for example, a first device.

It should be understood that FIG. 3 shows an example of a system applied to an embodiment of this application, but this application is not limited thereto. For example, one, two, four, or more requesting devices may also be connected to the AP, and these all fall within the protection scope of embodiments of this application.

With reference to the accompanying drawings, the following describes in detail a security authentication method and apparatus applied to Wi-Fi provided in this application.

The technical solutions of this application may be applied to a Wi-Fi communication system, for example, a communication system shown in FIG. 3. There may be a wireless communication connection relationship between apparatuses in the Wi-Fi communication system. One apparatus in the apparatuses may be, for example, an AP or a chip configured in the AP, and another apparatus may be, for example, a first device or a chip configured in the first device. This is not limited in this embodiment of this application.

The following describes embodiments of this application in detail by using a security authentication process of the AP and the first device as an example. It may be understood that both the chip configured in the AP and the chip configured in the first device may perform security authentication based on a same method. This is not limited in this application.

FIG. 4 is a schematic flowchart of a security authentication method 400 applied to Wi-Fi according to an embodiment of this application. The method 400 may include steps 410 to 430.

410: An AP may negotiate, based on a password, a PMK (that is, generate a PMK) with a first device based on a twin base password encrypted key exchange (TBPEKE) protocol. The password is a shared key between the AP and the first device. For example, in FIG. 4, the TBPEKE protocol may be used to replace an SAE protocol in WPA3.

420: The AP performs an association with the first device based on the PMK.

430: The AP performs a 4-way handshake with the first device.

For steps 420 and 430, refer to descriptions in FIG. 1. Details are not described again.

Therefore, in this embodiment of this application, a PMK with a high entropy value can be generated by performing a TBPEKE procedure, so that the security authentication method provided in this embodiment of this application can help resist an offline dictionary attack. In addition, because TBPEKE can easily avoid a side channel attack, in this embodiment of this application, the PMK is generated by executing the TBPEKE, which can improve anti-side channel attack capabilities of the AP and the first device in a security authentication process of Wi-Fi, and help the AP and the first device avoid a side channel attack during security authentication.

The TBPEKE is also a PAKE protocol. FIG. 5 shows an example of a TBPEKE procedure. As shown in FIG. 5, public parameters of both communication parties A and B in TBPEKE include: a cyclic group G whose order is a prime p, two independent random generating elements U and V (represented as U and $$V \xleftarrow{R} G)$$

in the group, and a hash function H (a hash function onto $\{0,1\}^l$, represented as H:$\{0,1\}^* \rightarrow \{0,1\}^l$) that outputs $\{0,1\}^l$. H:$\{0,1\}^* \rightarrow \{0,1\}$ is a secure hash function, for example, may be SHA256.

In the TBPEKE, A and B share a password pw. Based on the public parameters and the password pw, A may calculate:

$$g \leftarrow U \cdot V^{pw}, x \xleftarrow{R} Z_p^*, \text{ and } X \leftarrow g^x.$$

Then, A sends A∥X to B.

Based on the public parameters and the password pw, B may also calculate:

$$g \leftarrow U \cdot V^{pw}, y \xleftarrow{R} Z_p^*, \text{ and } Y \leftarrow g^y.$$

Then, B sends Y to A.

After receiving Y, A may calculate: $Z \leftarrow Y^x$.

After receiving A∥X, B may calculate: $Z \leftarrow X^y$.

Then, A and B may separately calculate a key sk based on A, B, g, X, Y, and Z. For example, sk may be calculated based on the following formula:

$$sk \leftarrow H(A\|B\|g\|X\|Y\|Z).$$

It should be noted that, when G represents an elliptic curve group, that $g = U \cdot V^{pw}$ may be considered as a hash-to-curve function for converting the password pw into a point on an elliptic curve. In the hash-to-curve function g, a point multiplication operation is involved for pw. The point multiplication operation can effectively implement resisting a side channel attack.

In this embodiment of this application, a first parameter X and a second parameter Y that are transmitted between the AP and the first device are generated based on the hash-to-curve function g and a random number, and do not involve calculation of the password pw. Therefore, it is very difficult for an attacker to know the password pw, which can improve anti-side channel attack capabilities of the AP and the first device in a security authentication process of Wi-Fi.

However, in the conventional technology, when an SAE procedure is used in a WPA3 protocol to calculate a PMK, a shared password needs to be used for calculation. In this way, through channel testing and based on brute force cracking and other means, the attacker can obtain the password, causing the password to be compromised.

Optionally, in a process of performing step 410, some modifications may be made to the TBPEKE procedure shown in FIG. 5 as required. For example, when B is used as the AP, B may retain: $g = U \cdot V^{pw}$ instead of pw. For another example, when identity authentication needs to be performed on a plurality of As, B may reuse Y and y, and does not need to use different Y and y for each A.

Figure 6:
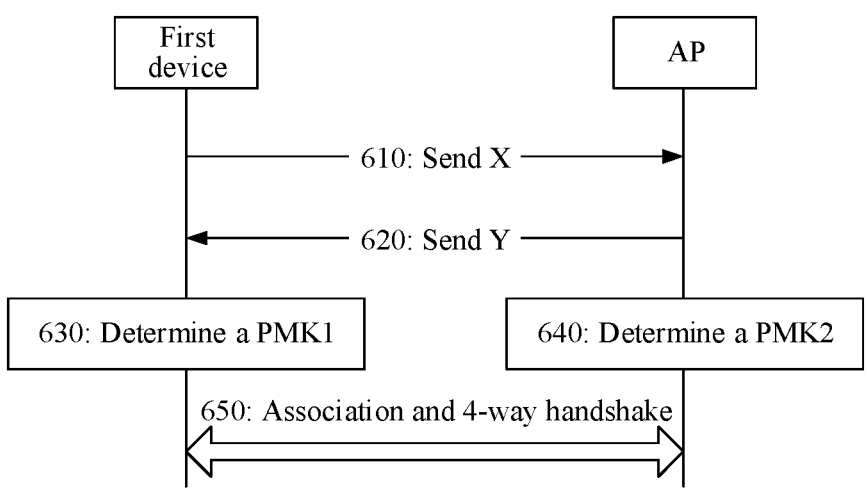
FIG. 6 is a schematic flowchart of a security authentication method applied to Wi-Fi according to an embodiment of this application.

FIG. 6 is a schematic flowchart of a security authentication method 600 applied to Wi-Fi according to an embodiment of this application. As an example, the method 600 may be performed by a first device and an AP. In the method 600, both the first device and the AP share a password pw, negotiate a pairwise master key PMK based on a twin base password encrypted key exchange TBPEKE protocol, and perform a 4-way handshake based on the PMK. As shown in FIG. 6, the method 600 includes steps 610 to 650.

610: The first device sends X to the access point AP. Correspondingly, the AP receives X from the first device. A first parameter X is determined based on a hash-to-curve function g.

In some embodiments, the first device may determine the first parameter X based on the hash-to-curve function g. The hash-to-curve function g is for converting the password pw into a point on an elliptic curve through a point multiplication operation, $X = g^x$, and x is a random number. As an example, x is a random number selected from $Z_p^*,$ in other words, $x \in$ $Z_p^*.$ In some embodiments, the first device may further send an ID of the first device to the access point AP, where the ID of the first device uniquely identifies the first device. For example, the first device may send a connection request to the AP, where the connection request may include the first parameter X and the ID of the first device. This is not limited in this application.

As an example, the ID of the first device may be a MAC address of the first device. This is not limited in this application. In this case, a frame format of a message (for example, the connection request) sent by the first device to the AP may include the MAC address. This is not limited in this application.

As an example, based on the foregoing TBPEKE protocol, g may be represented as the following formula:

$$g=U \cdot V^{pw}.$$

U and V are two independent random generating elements obtained from a cyclic group G whose order is a prime p.

Before some optional embodiments, the AP may further send a broadcast message, where the broadcast message may further include RSNEwithsupp. ciphers, to notify capabilities of the ciphers. Correspondingly, the first device selects a matched cipher, that is, selects a cipher suite supported by the first device, to obtain the foregoing g, or obtain related parameters (for example, the foregoing U and V) of g. That the AP broadcasts RSNEwithsupp. ciphers and the first device selects a matched cipher may be an example in which the AP performs an association with the first device to agree on the to-be-used security suite. As an example, after the first device selects the cipher suite, g, or U and V may be stored on a first device side as a system parameter(s).

As an example, the broadcast message may be a beacon frame, and the beacon frame may be sent before step 610. This is not limited in this application.

In some embodiments, before performing step 610, that is, before sending the first parameter X to the AP, the first device may determine the hash-to-curve function g based on the system parameters U and V and the password pw.

In some embodiments, the broadcast message may further include an ID of the AP. Correspondingly, the first device may receive the broadcast message, and obtain the ID of the AP from the broadcast message. As an example, the ID of the AP may be a MAC address of the AP.

620: The AP sends Y to the first device.

In some embodiments, the AP may determine a second parameter Y. The second parameter Y is determined based on the hash-to-curve function g, $Y=g^y$, and y is a random number. As an example, y is a random number selected from $Z_p^*,$ in other words, $y \in Z_p^*.$ For the hash-to-curve function g, refer to descriptions in step 610. Details are not described again.

As a possible implementation, an AP end may retain: $g=U \cdot V^{pw}$ instead of the password pw. In other words, that $g=U \ V^{pw}$ may be pre-stored locally in the AP, and the password pw does not need to be pre-stored locally in the AP. In this way, when receiving the first parameter and the MAC address of the first device that are sent by the first device, the AP may directly select the random number y, and calculate Y based on the random number y and the pre-stored g, instead of calculating g based on the pw.

It should be noted that, in step 610, g determined by the first device side is the same as g retained by an AP side, which may be implemented by, for example, presetting code in the first device and the AP respectively. This is not limited in this application.

Therefore, in this embodiment of this application, the AP end directly retains: $g=U \cdot V^{pw}$ instead of the password pw, so that the AP can be prevented from calculating g in real time during device authentication, which can reduce a calculation amount of the AP end, and then help reduce or avoid a denial of service (DoS) attack on the AP.

As another possible implementation, the AP end may reuse the second parameter Y. As an example, when the AP end performs device authentication with a plurality of first devices and these first devices may use a same password pw to execute security protocols with the AP, the AP may reuse the second parameter Y. For example, after the AP sends a second parameter Y to a second first device, if the AP receives the first parameter X and the ID of the first device that are sent by the first device, the AP may not need to calculate a new second parameter based on that $Y=g^y$, but may directly send, to the first device, the second parameter that is previously sent to the second first device.

It may be understood that, because $Y=g^y$, that the AP end reuses the second parameter Y may also be equivalent to the AP end reusing the random number y. This is not limited in this application.

Therefore, in this embodiment of this application, the AP end reuses the second parameter Y or the random number y, so that the AP can be prevented from calculating the second parameter Y in real time during device authentication, which can reduce a calculation amount of the AP end, and then help reduce or avoid a DoS attack on the AP.

In another possible implementation, the AP end may store the foregoing two independent random generating elements U and V as system parameters, determine the hash-to-curve function g based on U and V, and the password pw, further pick the random number y, and determine the second parameter Y based on that $Y=g^y$. This is not limited in this application.

In some embodiments, in step 620, the AP may send a response message corresponding to the connection request to the first device, where the response message may include Y. This is not limited in this application.

630: The first device determines a PMK1.

Specifically, the first device may determine a pairwise master key PMK1 based on the first parameter X and the second parameter Y.

For example, the first device may calculate the PMK1 based on the first parameter X, the second parameter Y, the ID of the first device, and the ID of the AP. As an example, the first device may calculate the PMK1 based on the following formula:

$$PMK1 = KDF(Z, id_{dev} \| id_{AP} \| X \| Y).$$

$Z = Y^x$, $id_{dev}$ represents the ID of the first device, $id_{AP}$ represents the ID of the AP, and KDF( ) is a standard key derivation function.

640: The AP determines a PMK2.

For example, the AP may determine a pairwise master key PMK2 based on the first parameter X and the second parameter Y.

For example, the AP may calculate the PMK2 based on the first parameter X, the second parameter Y, the ID of the first device, and the ID of the AP. As an example, the AP may calculate the PMK2 based on the following formula:

$$PMK2 = KDF(Z, id_{dev} \| id_{AP} \| X \| Y).$$

$Z = X^y$, $id_{dev}$ represents the ID of the first device, $id_{AP}$ represents the ID of the AP, and KDF( ) is a standard key derivation function.

650: The first device and the AP perform an association and a 4-way handshake.

Through an association and the 4-way handshake process, both the AP and the first device may perform mutual identity authentication, and generate a session key and a group transient key, to protect subsequent unicast communications between a requesting device and the AP and broadcast communication of the AP. For example, in a subsequent association and 4-way handshake process, the first device and the AP may comply with WPA3 specifications. As an example, refer to descriptions in FIG. 1. Details are not described again.

Therefore, in this embodiment of this application, the first device may send the first parameter X to the AP, and the AP may send the second parameter Y to the first device, where the first parameter X and the second parameter Y are separately determined based on the hash-to-curve function g. Further, the first device may calculate the PMK1 based on the first parameter X and the second parameter Y, and the AP may calculate the PMK2 based on the first parameter X and the second parameter Y. In this embodiment of this application, the first parameter X and the second parameter Y that are transmitted between the AP and the first device are generated based on the hash-to-curve function g and the random number, and do not involve calculation of the password. Therefore, it is very difficult for an attacker to know the password, which can improve anti-side channel attack capabilities of the AP and the first device in a security authentication process of Wi-Fi, and help the AP and the first device avoid a side channel attack during security authentication.

However, in the conventional technology, when an SAE procedure is used in a WPA3 protocol to calculate a PMK, a shared password needs to be used for calculation. In this way, through channel testing and based on brute force cracking and other means, the attacker can obtain the password, causing the password to be compromised.

Figure 7:
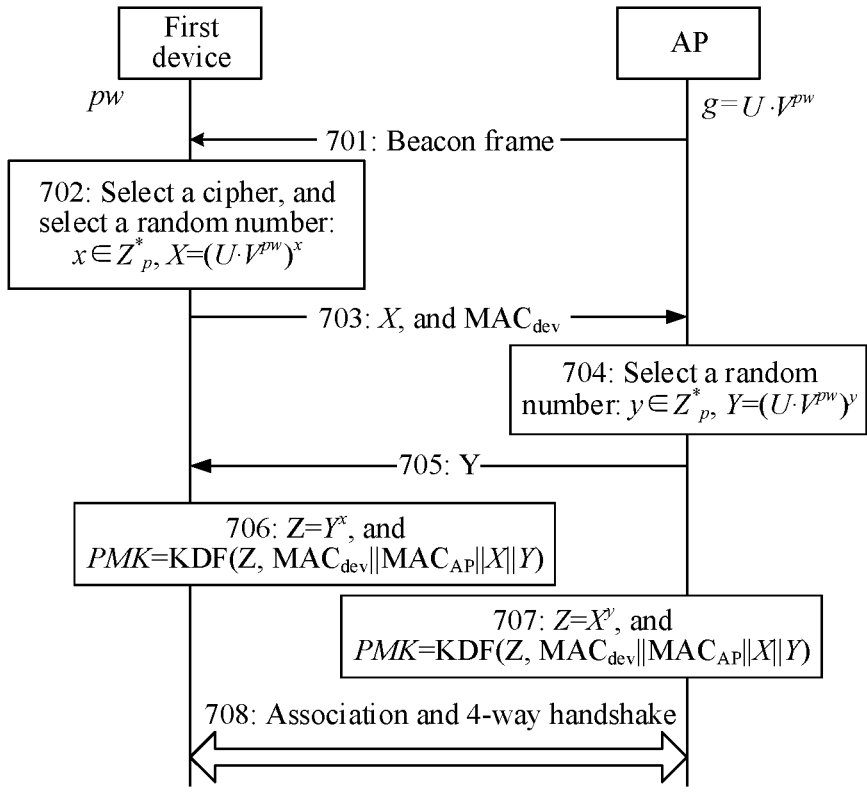
FIG. 7 is a schematic flowchart of another security authentication method applied to Wi-Fi according to an embodiment of this application.

FIG. 7 is a schematic flowchart of a security authentication method 700 applied to Wi-Fi according to an embodiment of this application. As an example, the method 700 may be performed by a first device and an AP. In the method 700, both the first device and the AP share a password pw, and an AP end retains: $g = U \cdot V^{pw}$. Specifically, for the first device or the AP, refer to the foregoing descriptions.

It should be understood that FIG. 7 shows steps or operations of the security authentication method applied to Wi-Fi. However, these steps or operations are merely examples. In this embodiment of this application, other operations or variations of the operations in FIG. 7 may alternatively be performed. In addition, the steps in FIG. 7 may be performed in a sequence different from that presented in FIG. 7, and the operations in FIG. 7 may not necessarily be all performed.

As shown in FIG. 7, the method 700 includes steps 701 to 708.

701: The AP broadcasts a beacon frame. The beacon frame may include a MAC address (which may be represented as $MAC_{AP}$) of the AP. Optionally, the beacon frame may further include RSNEwithsupp. ciphers, to notify capabilities of the ciphers. This is not limited in this application.

Correspondingly, a terminal device within the coverage of a Wi-Fi network of the AP may receive the beacon frame, and obtain information in the beacon frame. As an example, the first device shown in FIG. 7 may receive the beacon frame, and determine that the first device needs to be connected to the Wi-Fi network provided by the AP.

702: The first device selects a cipher, selects a random number:

$$x \in Z_p^*,$$

and determines: $X = (U \cdot V^{pw})^x$.

For example, that the first device selects a cipher may mean that the first device selects a cipher suite supported by the first device, to obtain a hash-to-curve function g, or obtain related parameters (for example, U and V) of g. This is not limited in this application. After the first device selects the cipher suite, g, or U and V may be stored on a first device side as a system parameter(s).

As an example, the first device selects a random number:

$$x \in Z_p^*,$$

and determines: $X = (U \cdot V^{pw})^x$. Specifically, U and V are two independent random generating elements obtained from a cyclic group G whose order is a prime p, and may be stored on the first device side as the system parameters. The first device may determine the hash-to-curve function: $g = U \cdot V^{pw}$ based on the system parameter U and V and a password pw. The hash-to-curve function g converts the password pw into a point on an elliptic curve through a point multiplication operation. Then, the first device may select a random number:

$$x \in Z_p^*,$$

and determine the first parameter: $X = (U \cdot V^{pw})^x$ based on the hash-to-curve function g and the random number x. Specifically, for a process of determining the first parameter X, refer to descriptions of step 610 in FIG. 6. Details are not described herein again.

703: The first device sends X and $MAC_{dev}$ to the AP.

For example, the first device may send a connection request to the AP, where the connection request may include the first parameter X and a MAC address $MAC_{dev}$ of the first device. This is not limited in this application.

It should be noted that, in this embodiment of this application, an example in which an identifier of the first device is the MAC address of the first device and an identifier of the AP is the MAC address of the AP is used for description. However, this embodiment of this application is not limited thereto. For example, in some other embodiments, the first device may alternatively send, to the AP, another identifier uniquely identifying the first device. This is not limited in this application.

704: The AP selects a random number:

$$y \in Z_p^*,$$

then $Y=(U \cdot V^{pw})^y$.

As an implementation, the AP end may retain: $g=U \cdot V^{pw}$ instead of the password pw. Therefore, after receiving the first parameter X and $MAC_{dev}$, the AP end may select the random number y, and determine the second parameter: $Y=(U \cdot V^{pw})^y$ based on the pre-stored hash-to-curve function: $g=U \cdot V^{pw}$ and the random number y.

It should be noted that, in step 702, g determined by the first device side is the same as g retained by an AP side, which may be implemented by, for example, presetting code in the first device and the AP respectively. This is not limited in this application.

Therefore, in this embodiment of this application, the AP end directly retains: $g=U \cdot V^{pw}$ instead of the password pw, so that the AP can be prevented from calculating g in real time during device authentication, which can reduce a calculation amount of the AP end, and then help reduce or avoid a DoS attack.

In some optional embodiments, when the AP end receives connection requests sent by a plurality of (that is, two or more) first devices, the AP end may reuse y and Y. In this way, the AP can be prevented from calculating the second parameter Y in real time during device authentication, which can reduce a calculation amount of the AP end, and then help reduce or avoid a DoS attack.

705: The AP sends Y to the first device.

706: The first device calculates: $Z=Y^x$, and $PMK=KDF$ $(Z,MAC_{dev}\|MAC_{AP}\|X\|Y)$.

707: The AP calculates: $Z=X^y$, and $PMK=KDF(Z, MAC_{dev}\|MAC_{AP}\|X\|Y)$.

Specifically, for steps 706 and 707, refer to descriptions of steps 630 and 640 in FIG. 6. Details are not described again.

708: The first device and the AP perform an association and a 4-way handshake.

Through an association and 4-way handshake process, both the AP and the first device may perform mutual identity authentication, and generate a session key and a group transient key, to protect subsequent unicast communications between a requesting device and the AP and broadcast communication of the AP. For example, for the association and the 4-way handshake process, refer to descriptions in FIG. 1. Details are not described again.

Therefore, in this embodiment of this application, the first device may send the first parameter X to the AP, and the AP may send the second parameter Y to the first device, where the first parameter X and the second parameter Y are separately determined based on the hash-to-curve function g. Further, the first device may calculate the PMK1 based on the first parameter X and the second parameter Y, and the AP may calculate the PMK2 based on the first parameter X and the second parameter Y. In this embodiment of this application, the first parameter X and the second parameter Y that are transmitted between the AP and the first device are generated based on the hash-to-curve function g and the random number, and do not involve calculation of the password. Therefore, it is very difficult for an attacker to know the password, which can improve anti-side channel attack capabilities of the AP and the first device in a security authentication process of Wi-Fi, and help the AP and the first device avoid a side channel attack during security authentication.

However, in the conventional technology, when an SAE procedure is used in a WPA3 protocol to calculate a PMK, a shared password needs to be used for calculation. In this way, through channel testing and based on brute force cracking and other means, the attacker can obtain the password, causing the password to be compromised.

Figure 8:
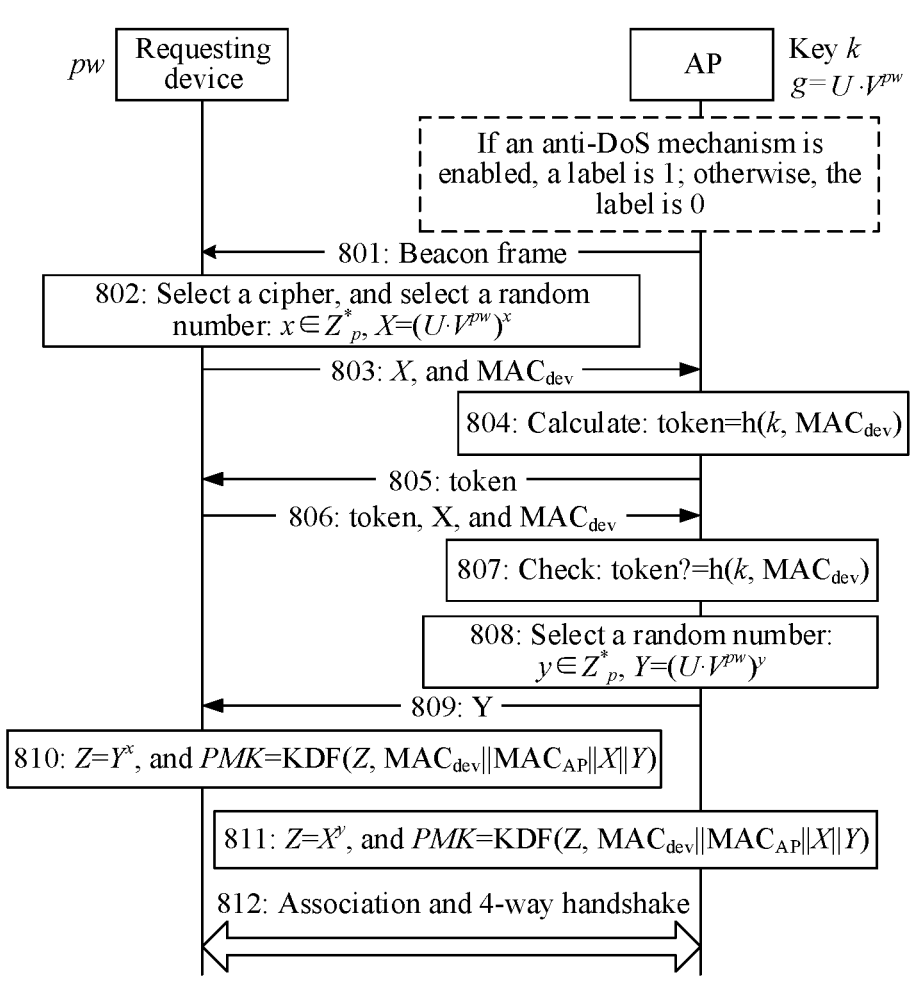
FIG. 8 is a schematic flowchart of another security authentication method applied to Wi-Fi according to an embodiment of this application.

FIG. 8 is a schematic flowchart of a security authentication method 800 applied to Wi-Fi according to an embodiment of this application. In the method 800, an AP may send an anti-DoS token to a first device, and perform verification on a token sent by the first device again, to further enhance an anti-DoS attack capability. In the method 800, both the first device and the AP share a password pw, an AP end retains: $g=U \cdot V^{pw}$, and a key k is additionally set, where the key k is for generating the anti-DoS token.

It should be understood that FIG. 8 shows steps or operations of the security authentication method applied to Wi-Fi. However, these steps or operations are merely examples. In this embodiment of this application, other operations or variations of the operations in FIG. 8 may alternatively be performed. In addition, the steps in FIG. 8 may be performed in a sequence different from that presented in FIG. 8, and the operations in FIG. 8 may not necessarily be all performed.

As shown in FIG. 8, the method 800 includes steps 801 to 812.

Optionally, in this embodiment of this application, whether to enable an anti-DoS mechanism may be set. As an example, a label may be preset. When the anti-DoS mechanism is enabled, a label value may be set to 1; otherwise, the label value may be set to 0. When the anti-DoS mechanism is enabled, verification may be performed on the token sent by the first device, and/or Y and y may be reused. This is not limited in this application.

801: The AP broadcasts a beacon frame. Correspondingly, the first device may receive the beacon frame, and determine that the first device needs to be connected to a Wi-Fi network provided by the AP.

802: The first device selects a cipher, selects a random number:

$$x \in Z_p^*,$$

and determines: $X=(U \cdot V^{pw})^x$.

803: The first device sends X and $MAC_{dev}$ to the AP. Correspondingly, the AP receives X and $MAC_{dev}$.

Specifically, for steps 801 to 803, refer to descriptions of steps 701 to 703 in FIG. 7. Details are not described herein again.

804: The AP calculates: $token=h(k,MAC_{dev})$.

As an example, when receiving a connection request sent by the first device, the AP may generate, based on the retained key k and a MAC address $MAC_{dev}$ of the first device in the connection request, the token bound to the $MAC_{dev}$ address h( ) is a secure hash function.

805: The AP sends the token to the first device. To be specific, after generating the token bound to the foregoing $MAC_{dev}$ address, the AP returns the token to the first device. Correspondingly, the first device receives the token.

806: The first device sends a token, X, and $MAC_{dev}$ to the AP. Correspondingly, the AP receives the token, X, and $MAC_{dev}$.

As an example, the first device commits a connection request and a token to the AP again. For example, the token may be carried in the connection request. This is not limited in this application. For example, the token may also be encapsulated together with the connection request in a message and sent to the AP.

For example, in step 803, the first device may send a first connection request to the AP, where the first connection request may include X and $MAC_{dev}$; and in step 806, the first device may send a second connection request to the AP, where the second connection request may include the token, X, and $MAC_{dev}$.

807: The AP checks: token?=h(k,$MAC_{dev}$). To be specific, the AP checks whether the token received in step 806 is equal to the token calculated by the AP in step 804.

When token=h(k,$MAC_{dev}$), to be specific, when the token received by the AP in step 806 is equal to the token calculated by the AP in step 804, the token is verified. In this case, the AP may further process the connection request of the first device.

When token≠h(k,$MAC_{dev}$), to be specific, when the token received by the AP in step 806 is not equal to the token calculated by the AP in step 804, the token is unsuccessfully verified. In this case, the AP may not process the connection request of the first device.

It may be understood that when the token is unsuccessfully verified, it represents that the token does not match the MAC address bound to the token. Therefore, in this case, the first device may use a false MAC address to maliciously attack the AP, and the first device may be an attacker. Therefore, the AP may not process the connection request of the first device, to reduce or avoid a DoS attack.

In some optional embodiments, when the label value is set to 1, the foregoing steps 804 to 807 may be performed. When the label value is set to 0, the foregoing steps 804 to 807 may not be performed. This is not limited in this application.

In some other optional embodiments, when no label value is set and the AP supports calculation and verification of the foregoing token, the AP may always perform steps 804 to 807 after receiving the connection request, that is, after step 803. This is not limited in this application.

808: The AP selects a random number:

$$y \in Z_p^*,$$

then $Y=(U \cdot V^{pw})^y$.

Specifically, for step 808, refer to descriptions of step 704 in FIG. 7. Details are not described herein again.

In some optional embodiments, when the label value is set to 1 and the AP receives a plurality of connection requests, the AP may reuse Y and y. When the label value is set to 0 and the AP receives a plurality of connection requests, the AP does not reuse Y and y, that is, separately selects y and calculates Y for different first devices.

In some other optional embodiments, when no label value is set, the AP may always reuse Y and y when receiving a plurality of connection requests. This is not limited in this application.

809: The AP sends Y to the first device.

810: The first device calculates: $Z=Y^x$, and $PMK=KDF(Z,MAC_{dev}\|MAC_{AP}\|X\|Y)$.

811: The AP calculates: $Z=X^y$, and $PMK=KDF(Z,MAC_{dev}\|MAC_{AP}\|X\|Y)$.

812: The first device and the AP performs an association and a 4-way handshake.

Specifically, for steps 809 to 812, refer to descriptions of steps 705 to 708 in FIG. 7. Details are not described herein again.

Therefore, in this embodiment of this application, the AP may generate, based on the MAC address of the first device and the key stored by the AP end, the anti-DoS token bound to the MAC address of the first device, and return the token to the first device; and the first device needs to send the MAC address of the first device and a token to the AP again, so that the AP can perform verification on the MAC address of the first device and the corresponding token, and process the connection request of the first device only when the token is verified, which can help prevent the AP from processing all connection requests, and then help reduce or avoid a DoS attack on the AP.

Figure 9:
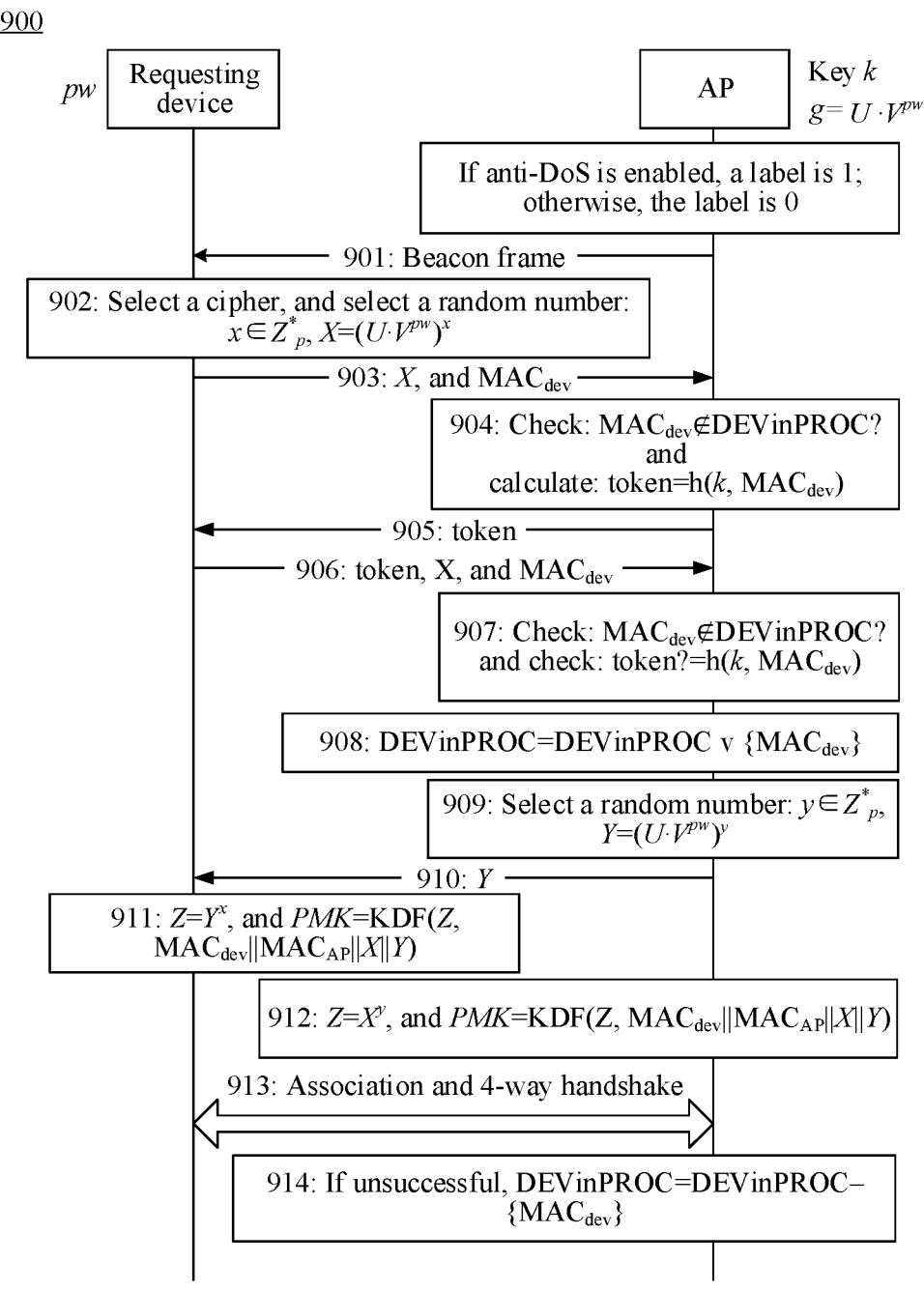
FIG. 9 is a schematic flowchart of another security authentication method applied to Wi-Fi according to an embodiment of this application.

FIG. 9 is a schematic flowchart of a security authentication method 900 applied to Wi-Fi according to an embodiment of this application. In the method 900, an AP may maintain a list of devices in processing (DEVinPROC), and the AP further processes a connection request of a first device only when the first device is not in the list of devices in processing. In the method 900, both the first device and the AP share a password pw, an AP end may retain: $g=U \cdot V^{pw}$, and a key k is additionally set.

It should be understood that FIG. 9 shows steps or operations of the security authentication method applied to Wi-Fi. However, these steps or operations are merely examples. In this embodiment of this application, other operations or variations of the operations in FIG. 9 may alternatively be performed. In addition, the steps in FIG. 9 may be performed in a sequence different from that presented in FIG. 9, and the operations in FIG. 9 may not necessarily be all performed.

As shown in FIG. 9, the method 900 includes steps 901 to 914.

Optionally, in this embodiment of this application, a yes/no label may be set. When an anti-DoS mechanism is enabled, a label value may be set to 1; otherwise, the label value may be set to 0. For details, refer to descriptions in FIG. 8. Details are not described again.

901: The AP broadcasts a beacon frame. Correspondingly, the first device may receive the beacon frame, and determine that the first device needs to be connected to a Wi-Fi network provided by the AP.

902: The first device selects a cipher, selects a random number:

$$x \in Z_p^*,$$

and determines: $X=(U \cdot V^{pw})^x$.

903: The first device sends X and $MAC_{dev}$ to the AP. Correspondingly, the AP receives X and $MAC_{dev}$.

Specifically, for steps 901 to 903, refer to descriptions of steps 801 to 803 in FIG. 8. Details are not described herein again.

904: The AP checks: $MAC_{dev} \notin$ DEVinPROC? and calculates: token=h(k,$MAC_{dev}$).

Specifically, when $MAC_{dev} \notin VinPROC$, the AP calculates: token=$h(k, MAC_{dev})$; and when $MAC_{dev} \in DEVinPROC$, the AP does not calculate: token=$h(k, MAC_{dev})$.

As an example, the list of devices in processing (which may be represented as DEVinPROC) maintained by the AP end may include a MAC address of at least one terminal device (namely, a device in processing) connected to the network provided by the AP. When a MAC address of the first device is not in DEVinPROC (that is, $MAC_{dev} \notin DEVinPROC$), the AP further processes the connection request of the first device, that is, calculates: token=$h(k, MAC_{dev})$ for the first device based on the MAC address of the first device and the key retained by the AP end. However, when the MAC address of the first device is in DEVinPROC ($MAC_{dev} \in DEVinPROC$), it represents that the first device can be connected to the network provided by the AP. In this case, it may be inferred that the first device uses a false MAC address to maliciously attack the AP, and the first device may be an attacker. Therefore, in this case, the AP may not process the connection request of the first device, that is, does not calculate the token for the first device, to reduce or avoid a DoS attack on the AP.

905: The AP sends the token to the first device. To be specific, after generating the token bound to the foregoing $MAC_{dev}$ address, the AP returns the token to the first device. Correspondingly, the first device receives the token.

906: The first device sends a token, X, and $MAC_{dev}$ to the AP.

As an example, the first device commits a connection request and a token to the AP again. For example, the token may be carried in the connection request. This is not limited in this application. For example, the token may also be encapsulated together with the connection request in a message and sent to the AP.

Correspondingly, the AP receives the token, X, and $MAC_{dev}$.

907: The AP checks: $MAC_{dev} \notin DEVinPROC$? and checks: token?=$h(k, MAC_{dev})$. To be specific, the AP checks whether $MAC_{dev}$ received in step 906 is in a list of DEVinPROC, and checks whether the token is equal to the token calculated by the AP in step 904.

As an example, when $MAC_{dev}$ is not in the list of DEVinPROC, that is, $MAC_{dev} \notin DEVinPROC$, the AP may further check whether the token is equal to the token calculated by the AP in step 904.

When $MAC_{dev} \notin DEVinPROC$ and token=$h(k, MAC_{dev})$, to be specific, when the first device is not a device in processing and the token received by the AP in step 906 is equal to the token calculated by the AP in step 904, the AP may further process the connection request of the first device.

When $MAC_{dev} \notin DEVinPROC$ and token≠$h(k, MAC_{dev})$, to be specific, when the first device is not a device in processing, but the token received by the AP in step 906 is not equal to the token calculated by the AP in step 904, the AP may not process the connection request of the first device.

When $MAC_{dev} \in DEVinPROC$, the AP may not perform verification on the token, that is, may not process the connection request of the first device.

908: DEVinPROC=DEVinPROC∨$\{MAC_{dev}\}$.

Specifically, that DEVinPROC=DEVinPROC∨$\{MAC_{dev}\}$ represents that the MAC address of the first device may be added to an existing list of DEVinPROC, to update DEVinPROC. In this way, when the connection request that includes $MAC_{dev}$ is subsequently received, because $MAC_{dev}$ is already included in DEVinPROC, the AP may not process the connection request, which can help reduce or avoid a DoS attack on the AP.

909: Select a random number: $y \in Z_p^*$, then $Y=(U \cdot V^{pw})^y$.

910: The AP sends Y to the first device.

911: The first device calculates: $Z=Y^x$, and PMK=KDF$(Z, MAC_{dev}\|MAC_{AP}\|x\|Y)$.

912: The AP calculates: $Z=X^y$, and PMK=KDF$(Z, MAC_{dev}\|MAC_{AP}\|X\|Y)$.

913: The first device and the AP performs an association and a 4-way handshake.

Specifically, for steps 909 to 913, refer to descriptions of steps 808 to 812 in FIG. 8. Details are not described herein again.

914: If unsuccessful, DEVinPROC=DEVinPROC−$\{MAC_{dev}\}$.

Specifically, if identity authentication or key generation between the first device and the AP is unsuccessful, in other words, if the first device is not a device in processing of the AP in this case, the MAC address of the first device may be deleted from the current list of DEVinPROC. In this way, the first device may still send a connection request to the AP subsequently. In addition, because the MAC address of the first device is not in DEVinPROC, the AP may perform corresponding processing on the connection request of the first device.

Therefore, in this embodiment of this application, the AP further processes the connection request of the first device only when determining that the MAC address of the first device is not in the list of DEVinPROC, which can help prevent the AP from processing all connection requests, help reduce a calculation amount of the AP end, and then help reduce or avoid a DoS attack on the AP.

It may be understood that, in the foregoing embodiments of this application, the method implemented by the AP may also be implemented by a component (for example, a chip or a circuit) that may be used in the AP, and the method implemented by the first device may also be implemented by a component (for example, a chip or a circuit) that may be used in the first device.

Figure 10:
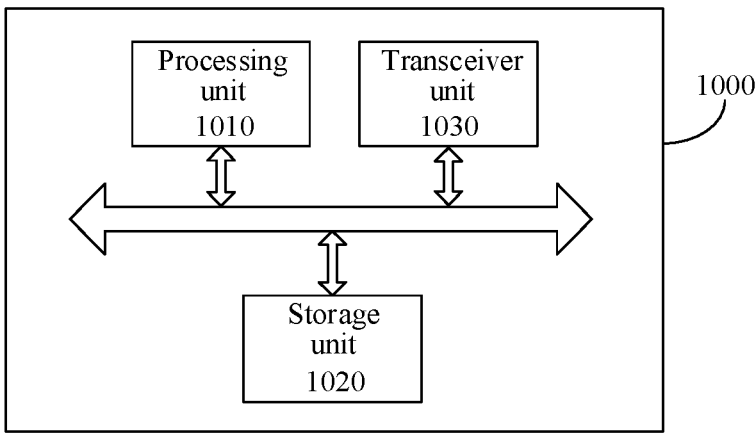
FIG. 10 is a schematic diagram of a security authentication apparatus applied to Wi-Fi according to an embodiment of this application.

Based on the foregoing method, FIG. 10 is a schematic diagram of a security authentication apparatus 1000 applied to Wi-Fi according to an embodiment of this application.

In some embodiments, the apparatus 1000 may be an AP, or may be a chip or a circuit, for example, a chip or a circuit that may be disposed in the AP. In some embodiments, the apparatus 1000 may be a first device, or may be a chip or a circuit, for example, a chip or a circuit that may be disposed in the first device.

The apparatus 1000 may include a processing unit 1010 (that is, an example of a processor) and a transceiver unit 1030.

Optionally, the transceiver unit 1030 may be implemented by using a transceiver, a transceiver-related circuit, or an interface circuit.

Optionally, the apparatus may further include a storage unit 1020. In a possible manner, the storage unit 1020 is configured to store instructions. Optionally, the storage unit may also be configured to store data or information. The storage unit 1020 may be implemented by using a memory.

In a possible design, the processing unit 1010 may be configured to execute the instructions stored in the storage unit 1020, so that the apparatus 1000 implements the steps performed by the AP in the foregoing method.

Further, the processing unit 1010, the storage unit 1020, and the transceiver unit 1030 may communicate with each other by using an internal connection path to transfer a control signal and/or a data signal. For example, the storage unit 1020 is configured to store a computer program, and the processing unit 1010 may be configured to invoke the computer program from the storage unit 1020 and run the computer program, to control the transceiver unit 1030 to receive a signal and/or send a signal, to complete the steps of the AP in the foregoing method.

For example, when the processing unit 1010 is a processor and the transceiver unit 1030 is a transceiver, the processor may be coupled to the transceiver, for example, send instructions to the transceiver, to indicate (or control) the transceiver unit to receive a signal and/or send a signal, to complete the steps of the AP in the foregoing method.

In a possible design, the processing unit 1010 may be configured to execute the instructions stored in the storage unit 1020, so that the apparatus 1000 implements the steps performed by the first device in the foregoing method.

Further, the processing unit 1010, the storage unit 1020, and the transceiver unit 1030 may communicate with each other by using an internal connection path to transfer a control signal and/or a data signal. For example, the storage unit 1020 is configured to store a computer program, and the processing unit 1010 may be configured to invoke the computer program from the storage unit 1020 and run the computer program, to control the transceiver unit 1030 to receive a signal and/or send a signal, to complete the steps of the first device in the foregoing method.

For example, when the processor unit 1010 is a processor and the transceiver unit 1030 is a transceiver, the processor may be coupled to the transceiver, for example, send instructions to the transceiver, to indicate (or control) the transceiver unit to receive a signal and/or send a signal, to complete the steps of the first device in the foregoing method.

The storage unit 1020 may be integrated into the processing unit 1010, or may be disposed separately from the processing unit 1010. The transceiver unit 1030 may be integrated into the processing unit 1010, or may be disposed separately from the processing unit 1010.

Optionally, if the apparatus 1000 is a communication device, the transceiver unit 1030 may include a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 1000 is a chip or a circuit, the transceiver unit 1030 may include an input interface and an output interface.

In an implementation, it may be considered that a function of the transceiver unit 1030 is implemented by using a transceiver circuit or a transceiver-dedicated chip. It may be considered that the processing unit 1010 is implemented by using a dedicated processing chip, a processing circuit, a processing unit, or a general-purpose chip.

In another implementation, it may be considered that a communication device (for example, the AP or the first device) provided in this embodiment of this application is implemented by using a general-purpose computer. That is, program code for implementing functions of the processing unit 1010 and the transceiver unit 1030 is stored in the storage unit 1020, and a general-purpose processing unit implements the functions of the processing unit 1010 and the transceiver unit 1030 by executing the code in the storage unit 1020.

In some implementations, when the apparatus 1000 is an AP or a chip or a circuit disposed in the AP, the processing unit 1010 may negotiate, based on a password, a pairwise master key PMK with a first device based on a twin base password encrypted key exchange TBPEKE protocol, where the password is a shared key between the AP and the first device. For example, the processing unit 1010 may negotiate with the first device by using the transceiver unit 1030.

The processing unit 1010 may further perform a 4-way handshake with the first device based on the PMK. For example, the processing unit 1010 may perform the 4-way handshake with the first device by using the transceiver unit 1030.

For example, the processing unit 1010 may negotiate with the first device by using the transceiver unit 1030, and the processing unit 1010 may perform the 4-way handshake with the first device by using the transceiver unit 1030.

In some possible implementations, the PMK includes a first PMK1 and a second PMK2.

The transceiver unit 1030 is configured to obtain a first parameter X from the first device, where the first parameter X is determined based on a hash-to-curve function g, the hash-to-curve function g is for converting the password into a point on an elliptic curve through a point multiplication operation, $X=g^x$, and x is a random number.

The transceiver unit 1030 is further configured to send a second parameter Y to the first device, to indicate the first device to calculate the first PMK1 based on the first parameter X and the second parameter Y, where the second parameter Y is determined based on the hash-to-curve function g, $Y=g^y$, and y is a random number.

The processing unit 1030 is further configured to calculate the second PMK2 based on the first parameter X and the second parameter Y.

In some possible implementations, the processing unit 1010 is further configured to perform an association with the first device to agree on a to-be-used security suite, where the security suite indicates the hash-to-curve function g.

In some possible implementations, the transceiver unit 1030 is configured to send a first message to the first device, where the first message indicates the first device to generate a first pairwise transient key PTK1, the first message includes a nonce of the AP, the first PTK1 is generated based on the first PMK1, the nonce of the AP, and a nonce of the first device, and the first PTK1 includes a first key confirmation key KCK1, a first key encryption key KEK1, and a first transient key TK1.

The transceiver unit 1030 is further configured to obtain a second message from the first device, where the message integrity of the second message is protected by using the first KCK1, and the second message includes the nonce of the first device.

The processing unit 1010 is further configured to generate a second PTK2 based on the second PMK2, the nonce of the AP, and the nonce of the first device, where the second PTK2 includes a second KCK2, a second KEK2, and a second TK2.

The transceiver unit 1010 is further configured to send a third message to the first device, where the third message includes a group transient key GTK, privacy of the GTK of the third message is protected by using the second KEK2, and the message integrity of the third message is protected by using the second KCK2.

The transceiver unit 1030 is further configured to obtain a fourth message from the first device, where the fourth message is for responding to the third message, and the message integrity of the fourth message is protected by using the second KCK2.

In some possible implementations, the hash-to-curve function g is represented as:

$$g = U \cdot V^{pw}.$$

U and V are two independent random generating elements obtained from a cyclic group G whose order is a prime p, and pw represents the password.

In some possible implementations, the hash-to-curve function g is pre-stored locally in the AP In some possible implementations, the second parameter Y is generated by the AP based on the hash-to-curve function g; or the second parameter Y is determined by the AP by reusing a second parameter Y sent to a second device.

In some possible implementations, the transceiver unit 1030 is further configured to obtain an identifier ID of the first device from the first device, and send a token for an anti-DoS service to the first device, where the token is determined based on the identifier ID of the first device and a key k.

The transceiver unit 1030 is further configured to obtain the token and the ID of the first device from the first device.

The processing unit 1010 is further configured to perform verification on the token based on the ID of the first device and the key k.

In some possible implementations, the processing unit 1010 is further configured to determine that a first list does not include the ID of the first device, where the first list includes an ID of at least one device connected to a network provided by the AP.

In some possible implementations, the processing unit 1010 is further configured to add the ID of the first device to the first list.

In some possible implementations, the ID of the first device includes a MAC address of the first device.

In some implementations, when the apparatus 1000 is a first device or a chip or a circuit disposed in the first device, the processing unit 1010 may negotiate, based on a password, a pairwise master key PMK with an access point AP based on a twin base password encrypted key exchange TBPEKE protocol, where the password is a shared key between the AP and the first device. For example, the processing unit may negotiate with the AP by using the transceiver unit.

The processing unit 1010 may further perform a 4-way handshake with the AP based on the PMK. For example, the processing unit may perform the 4-way handshake with the AP by using the transceiver unit.

For example, the processing unit 1010 may negotiate with the AP by using the transceiver unit 1030, and the processing unit 1010 may perform the 4-way handshake with the AP by using the transceiver unit 1030.

In some possible implementations, the PMK includes a first PMK1 and a second PMK2.

The transceiver unit 1030 is configured to send a first parameter X to the AP, where the first parameter X is determined based on a hash-to-curve function g, the hash-to-curve function g is for converting the password into a point on an elliptic curve through a point multiplication operation, $X = g^x$, and x is a random number.

The transceiver unit 1030 is further configured to obtain a second parameter Y from the AP, where the second parameter Y is determined based on the hash-to-curve function g, $Y = g^y$, y is a random number, and the first parameter X and the second parameter Y are used by the AP to calculate the second PMK2.

The processing unit 1010 is configured to calculate the first PMK1 based on the first parameter X and the second parameter Y.

In some possible implementations, the processing unit 1010 is further configured to perform an association with the AP to agree on a to-be-used security suite, where the security suite indicates the hash-to-curve function g.

In some possible implementations, the transceiver unit 1030 is further configured to receive a first message from the AP, where the first message includes a nonce of the AP.

The processing unit 1010 is further configured to generate, by the first device, a first pairwise transient key PTK1 based on the first PMK1, the nonce of the AP, and a nonce of the first device, where the first PTK1 includes a first key confirmation key KCK1, a first key encryption key KEK1, and a first transient key TKT.

The transceiver unit 1030 is further configured to send a second message to the AP, where the message integrity of the second message is protected by using the first KCK1, the second message includes the nonce of the first device, the second message indicates the AP to generate a second PTK2, the second PTK2 is generated based on the second PMK2, the nonce of the AP, and the nonce of the first device, and the second PTK2 includes a second KCK2, a second KEK2, and a second TK2.

The transceiver unit 1030 is further configured to obtain a third message from the AP, where the third message includes a group transient key GTK, privacy of the GTK of the third message is protected by using the second KEK2, and the message integrity of the third message is protected by using the second KCK2.

The transceiver unit 1030 is further configured to send a fourth message to the AP, where the fourth message is for responding to the third message, and the message integrity of the fourth message is protected by using a KCK.

In some possible implementations, the hash-to-curve function g is represented as:

$$g = U \cdot V^{pw}.$$

U and V are two independent random generating elements obtained from a cyclic group G whose order is a prime p, and pw represents the password.

In some possible implementations, the transceiver unit 1030 is further configured to send an identifier ID of the first device to the AP. The transceiver unit 1030 is further configured to receive a token for an anti-denial of service DoS service from the AP, where the token is generated based on a key k and the ID of the first device. The transceiver unit 1030 is further configured to send the token and an ID of a requesting device to the AP.

In some possible implementations, the ID of the first device includes a MAC address of the first device.

The units in the foregoing embodiment may also be referred to as modules, circuits, or components.

Functions and actions of the modules or the units in the apparatus 1000 listed above are merely examples for description. When the apparatus 1000 is configured in an AP or is the AP, the modules or the units in the apparatus 1000 may be configured to perform the actions or processing processes performed by the AP in the foregoing method embodiments. When the apparatus 1000 is configured in a first device or is the first device, the modules or the units in the apparatus 1000 may be configured to perform the actions or processing processes performed by the first device in the foregoing method embodiments.

For concepts, explanations, detailed descriptions, and other steps of the apparatus 1000 that are related to the technical solutions provided in embodiments of this application, refer to the descriptions of the content in the foregoing method or another embodiment. Details are not described herein again.

According to the method provided in embodiments of this application, an embodiment of this application further provides a communication system. The communication system includes the foregoing AP and first device.

It should be understood that, the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware, firmware, or any combination thereof. When software is used to implement embodiments, the foregoing embodiments may be implemented entirely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium. The computer-readable medium stores a computer program. When the computer program is executed by a computer, the steps performed by the AP or the steps performed by the first device according to any one of the foregoing embodiments are implemented.

An embodiment of this application further provides a computer program product. When the computer program product is executed by a computer, the steps performed by the AP or the steps performed by the first device according to any one of the foregoing embodiments are implemented.

An embodiment of this application further provides a system chip. The system chip includes: a communication unit and a processing unit. The processing unit may be, for example, a processor. The communication unit may be, for example, an input/output interface, a pin, or a circuit. The processing unit may execute computer instructions, so that a chip in a communication apparatus performs the steps performed by the AP or the steps performed by the first device provided in embodiments of this application.

Optionally, the computer instructions are stored in a storage unit.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry an instruction and/or data.

It should be noted that in embodiments provided in this application, there is no time limitation relationship between the steps, and the steps may be used as a solution, or may be combined with one or more other steps to form a solution. This is not limited in this application.

Embodiments in this application may be used independently, or may be used jointly. For example, any one or more steps in different embodiments may be combined to form an embodiment separately. This is not limited herein.

It should be understood that, in the foregoing embodiments, terms such as "first" and "second" are merely intended to distinguish different objects, and should not constitute any limitation on this application.

It should be further understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other ways. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for enabling a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A security authentication method applied to wireless fidelity (Wi-Fi), comprising:

negotiating, by an access point (AP) based on a password, a pairwise master key (PMK) with a first device based on a twin base password encrypted key exchange (TBPEKE) protocol, wherein the password is a shared key between the AP and the first device; and performing, by the AP, a 4-way handshake with the first device based on the PMK;

wherein the PMK comprises a first PMK1 and a second PMK2, and negotiating, by the AP based on the password, the PMK with the first device based on the TBPEKE protocol comprises:

obtaining, by the AP, a first parameter X from the first device, wherein the first parameter X is determined based on a hash-to-curve function (g) for converting the password into a point on an elliptic curve through a point multiplication operation, $X=g^x$, where x is a random number;

sending, by the AP, a second parameter Y to the first device, to indicate the first device to calculate the first PMK1 based on the first parameter X and the second parameter Y, wherein the second parameter Y is determined based on g, $Y=g^y$, where y is a random number; and calculating, by the AP, the second PMK2 based on the first parameter X and the second parameter Y.

2. The method according to claim 1, wherein before negotiating, by the access point AP based on the password, the PMK with the first device based on the TBPEKE protocol, the method further comprises:

performing, by the AP, an association with the first device to agree on a to-be-used security suite, wherein the security suite indicates g.

3. The method according to claim 1, wherein performing, by the AP, the 4-way handshake with the first device based on the PMK comprises:

sending, by the AP, a first message to the first device, wherein the first message indicates the first device to generate a first pairwise transient key (PTK1), the first message comprises a nonce of the AP, the first PTK1 is generated based on the first PMK1, the nonce of the AP, and a nonce of the first device, and the first PTK1 comprises a first key confirmation key (KCK1), a first key encryption key (KEK1), and a first transient key (TK1);

obtaining a second message from the first device, wherein a message integrity of the second message is protected by using the first KCK1, and the second message comprises the nonce of the first device;

generating, by the AP, a second PTK2 based on the second PMK2, the nonce of the AP, and the nonce of the first device, wherein the second PTK2 comprises a second KCK2, a second KEK2, and a second TK2;

sending, by the AP, a third message to the first device, wherein the third message comprises a group transient key (GTK), a privacy of the GTK of the third message is protected by using the second KEK2, and a message integrity of the third message is protected by using the second KCK2; and obtaining from the first device a fourth message for responding to the third message, wherein a message integrity of the fourth message is protected by using the second KCK2.

4. The method according to claim 1, wherein g is represented as:

$$g = U \cdot V^{pw}, \text{ wherein}$$

U and V are two independent randomly generated elements obtained from a cyclic group G whose order is a prime p, and pw represents the password.

5. The method according to claim 1, wherein g is pre-stored locally in the AP.

6. The method according to claim 1, wherein the second parameter Y is generated by the AP based on g; or
the second parameter Y is determined by the AP by reusing another second parameter Y sent to a second device.

7. The method according to claim 1, wherein before sending, by the AP, the second parameter Y to the first device, the method further comprises:
obtaining an identifier (ID) of the first device from the first device;
sending a token for an anti-DoS service to the first device, wherein the token is determined based on the ID of the first device and a key (k);
obtaining the token and the ID of the first device from the first device; and
performing verification on the token based on the ID of the first device and k.

8. The method according to claim 1, wherein before sending, by the AP, the second parameter Y to the first device, the method further comprises:
determining that a list does not comprise the ID of the first device, wherein the list comprises an ID of at least one device connected to a network provided by the AP.

9. The method according to claim 7, further comprising:
adding the ID of the first device to the list.

10. The method according to claim 7, wherein the ID of the first device comprises a MAC address of the first device.

11. A security authentication method applied to wireless fidelity (Wi-Fi), the method comprising:
negotiating, by a first device based on a password, a pairwise master key (PMK) with an access point (AP) based on a twin base password encrypted key exchange (TBPEKE) protocol, wherein the password is a shared key between the AP and the first device; and
performing, by the first device, a 4-way handshake with the AP based on the PMK;
wherein the PMK comprises a first PMK1 and a second PMK2, and negotiating, by the first device based on the password, the pairwise master key PMK with the AP based on the TBPEKE protocol comprises:
sending, by the first device, a first parameter (X) to the AP, wherein X is determined based on a hash-to-curve function (g) for converting the password into a point on an elliptic curve through a point multiplication operation, $X = g^x$, where x is a random number;
obtaining, by the first device, a second parameter (Y) from the AP, wherein Y is determined based on g, $Y = g^y$, where y is a random number, and X and Y are used by the AP to calculate the second PMK2; and
calculating, by the first device, the first PMK1 based on X and Y.

12. The method according to claim 11, wherein before negotiating, by the first device based on the password, the PMK with the AP based on the TBPEKE protocol, the method further comprises:
performing, by the first device, an association with the AP to agree on a to-be-used security suite, wherein the security suite indicates g.

13. The method according to claim 11, wherein performing, by the first device, the 4-way handshake with the AP based on the PMK comprises:
receiving, by the first device, a first message from the AP, wherein the first message comprises a nonce of the AP;
generating, by the first device, a first pairwise transient key (PTK1) based on the first PMK1, the nonce of the AP, and a nonce of the first device, wherein the first PTK1 comprises a first key confirmation key (KCK1), a first key encryption key (KEK1), and a first transient key (TK1);
sending a second message to the AP, wherein a message integrity of the second message is protected by using the first KCK1, the second message comprises the nonce of the first device, the second message indicates the AP to generate a second PTK2, the second PTK2 is generated based on the second PMK2, the nonce of the AP, and the nonce of the first device, and the second PTK2 comprises a second KCK2, a second KEK2, and a second TK2;
obtaining a third message from the AP, wherein the third message comprises a group transient key (GTK), a privacy of the GTK of the third message is protected by using the second KEK2, and a message integrity of the third message is protected by using the second KCK2; and
sending a fourth message to the AP, wherein the fourth message is for responding to the third message, and a message integrity of the fourth message is protected by using the second KCK2.

14. A security authentication apparatus applied to wireless fidelity (Wi-Fi), the apparatus comprising:
a processor and a transceiver, wherein
the processor is coupled to the transceiver and is configured to negotiate, based on a password, a pairwise master key (PMK) with a first device based on a twin base password encrypted key exchange (TBPEKE) protocol, wherein the password is a shared key between an access point (AP) and the first device; and
perform a 4-way handshake with the first device based on the PMK;
wherein the PMK comprises a first PMK1 and a second PMK2, and the processor is further configured to:
indicate the transceiver to obtain a first parameter (X) from the first device, wherein X is determined based on a hash-to-curve function (g) for converting the password into a point on an elliptic curve through a point multiplication operation, $X = g^x$, where x is a random number;
indicate the transceiver to send a second parameter (Y) to the first device, to indicate the first device to calculate the first PMK1 based on X and Y, wherein Y is determined based on g, $Y = g^y$, where y is a random number; and
calculate the second PMK2 based on X and Y.

15. The apparatus according to claim 14, wherein the processor is further configured to perform an association with the first device to agree on a to-be-used security suite, wherein the security suite indicates g.

16. The apparatus according to claim 14, wherein the processor is further configured to:

indice the transceiver to send a first message to the first device, wherein the first message indicates the first device to generate a first pairwise transient key (PTKT), the first message comprises a nonce of the AP, the first PTK1 is generated based on the first PMK1, the nonce of the AP, and a nonce of the first device, and the first PTK1 comprises a first key confirmation key (KCK1), a first key encryption key (KEK1), and a first transient key (TK1);

indicate the transceiver to obtain a second message from the first device, wherein a message integrity of the second message is protected by using the first KCK1, and the second message comprises the nonce of the first device;

generate a second PTK2 based on the second PMK2, the nonce of the AP, and the nonce of the first device, wherein the second PTK2 comprises a second KCK2, a second KEK2, and a second TK2;

indicate the transceiver to send a third message to the first device, wherein the third message comprises a group transient key (GTK), a privacy of the GTK of the third message is protected by using the second KEK2, and a message integrity of the third message is protected by using the second KCK2; and indicate the transceiver to obtain a fourth message from the first device, wherein the fourth message is for responding to the third message, and a message integrity of the fourth message is protected by using the second KCK2.

17. The apparatus according to claim 14, wherein g is represented as:

$$g = U \cdot V^{pw}, \text{ wherein}$$

U and V are two independent randomly generated elements obtained from a cyclic group G whose order is a prime p, and pw represents the password.

\* \* \* \* \*